(12) United States Patent
Yamamoto et al.

(10) Patent No.: US 9,784,464 B2
(45) Date of Patent: Oct. 10, 2017

(54) AIR-CONDITIONING CONTROL SYSTEM AND AIR-CONDITIONING CONTROL METHOD

(71) Applicant: Mitsubishi Electric Corporation, Chiyoda-ku (JP)

(72) Inventors: Takaya Yamamoto, Chiyoda-ku (JP); Yoshitaka Uno, Chiyoda-ku (JP); Mio Motodani, Chiyoda-ku (JP); Hiroshi Maitani, Chiyoda-ku (JP); Osamu Nakajima, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 274 days.

(21) Appl. No.: 14/771,685

(22) PCT Filed: Feb. 6, 2014

(86) PCT No.: PCT/JP2014/052805
§ 371 (c)(1),
(2) Date: Aug. 31, 2015

(87) PCT Pub. No.: WO2014/174871
PCT Pub. Date: Oct. 30, 2014

(65) Prior Publication Data
US 2016/0018124 A1 Jan. 21, 2016

(30) Foreign Application Priority Data
Apr. 22, 2013 (JP) ................. 2013-089269

(51) Int. Cl.
*F24F 11/00* (2006.01)
*G05B 13/02* (2006.01)
*G05D 23/19* (2006.01)

(52) U.S. Cl.
CPC .......... *F24F 11/006* (2013.01); *F24F 11/00* (2013.01); *F24F 11/0012* (2013.01);
(Continued)

(58) Field of Classification Search
CPC .. F24F 11/006; F24F 11/0017; F24F 11/0076; F24F 11/0015; F24F 11/0012;
(Continued)

(56) References Cited

U.S. PATENT DOCUMENTS 9,016,593 B2 * 4/2015 Metselaar ............ F24F 11/0012
236/1 C
9,696,052 B2 * 7/2017 Malchiondo
et al. ................... F24F 11/0012

(Continued)

FOREIGN PATENT DOCUMENTS

| JP | 6 102908 | 4/1994 |
|---|---|---|
| JP | 10 197027 | 7/1998 |

(Continued)

OTHER PUBLICATIONS

Extended European Search Report dated Nov. 18, 2016 in Patent Application No. 14788634.5.
(Continued)

*Primary Examiner* — Charles Kasenge
(74) *Attorney, Agent, or Firm* — Oblon, McClelland, Maier & Neustadt, L.L.P.

(57) ABSTRACT

A heat load predictor predicts a change over time of a heat amount to be processed by air-conditioning equipment, an operation plan creator previously creates an operation plan of the air-conditioning equipment to reduce an evaluation index under a first restrictive condition that a total process heat load be maintained at a same level or within a range of a predetermined amount of difference and a room temperature be maintained within a predetermined comfortable (Continued)

temperature range, and an operation plan corrector corrects the operation plan during controlling the air-conditioning equipment based on the operation plan. If an actually measured temperature differs from a predicted temperature predicted by the operation plan creator at the time of creating the operation plan, the operation plan creator predicts a change over time of the temperature in the room, and corrects the operation plan to minimize the evaluation index under the first restrictive condition.

13 Claims, 24 Drawing Sheets

(52) U.S. Cl.
CPC ...... *F24F 11/0015* (2013.01); *F24F 11/0017* (2013.01); *F24F 11/0076* (2013.01); *G05B 13/026* (2013.01); *G05D 23/1917* (2013.01); *G05D 23/1932* (2013.01); *F24F 2011/0026* (2013.01); *F24F 2011/0047* (2013.01); *F24F 2011/0061* (2013.01); *F24F 2011/0063* (2013.01); *F24F 2011/0064* (2013.01); *F24F 2011/0075* (2013.01); *Y02B 30/78* (2013.01)

(58) Field of Classification Search
CPC .............. F24F 11/00; F24F 2011/0061; F24F 2011/0064; F24F 2011/0075; F24F 2011/0063; F24F 2011/0026; G05D 23/1932; G05D 23/1917; G05B 13/026; Y02B 30/78
See application file for complete search history.

(56) References Cited

U.S. PATENT DOCUMENTS

| 2012/0305661 | A1* | 12/2012 | Malchiondo et al. ............... F24F 11/0012 236/44 A |
| 2013/0018513 | A1* | 1/2013 | Metselaar ............ F24F 11/0012 700/278 |

FOREIGN PATENT DOCUMENTS

| JP | 2006 29694 | 2/2006 |
| JP | 2008 82641 | 4/2008 |
| JP | 2010 32072 | 2/2010 |
| JP | 2011 144956 | 7/2011 |
| JP | 2011 214794 | 10/2011 |

OTHER PUBLICATIONS

Combined Chinese Office Action and Search Report dated Mar. 3, 2017 in Patent Application No. 201480022799.2 (with partial English translation and English translation of categories of cited documents).
International Search Report dated May 13, 2014 in PCT/JP2014/052805 Filed Feb. 6, 2014.

* cited by examiner

F I G. 3
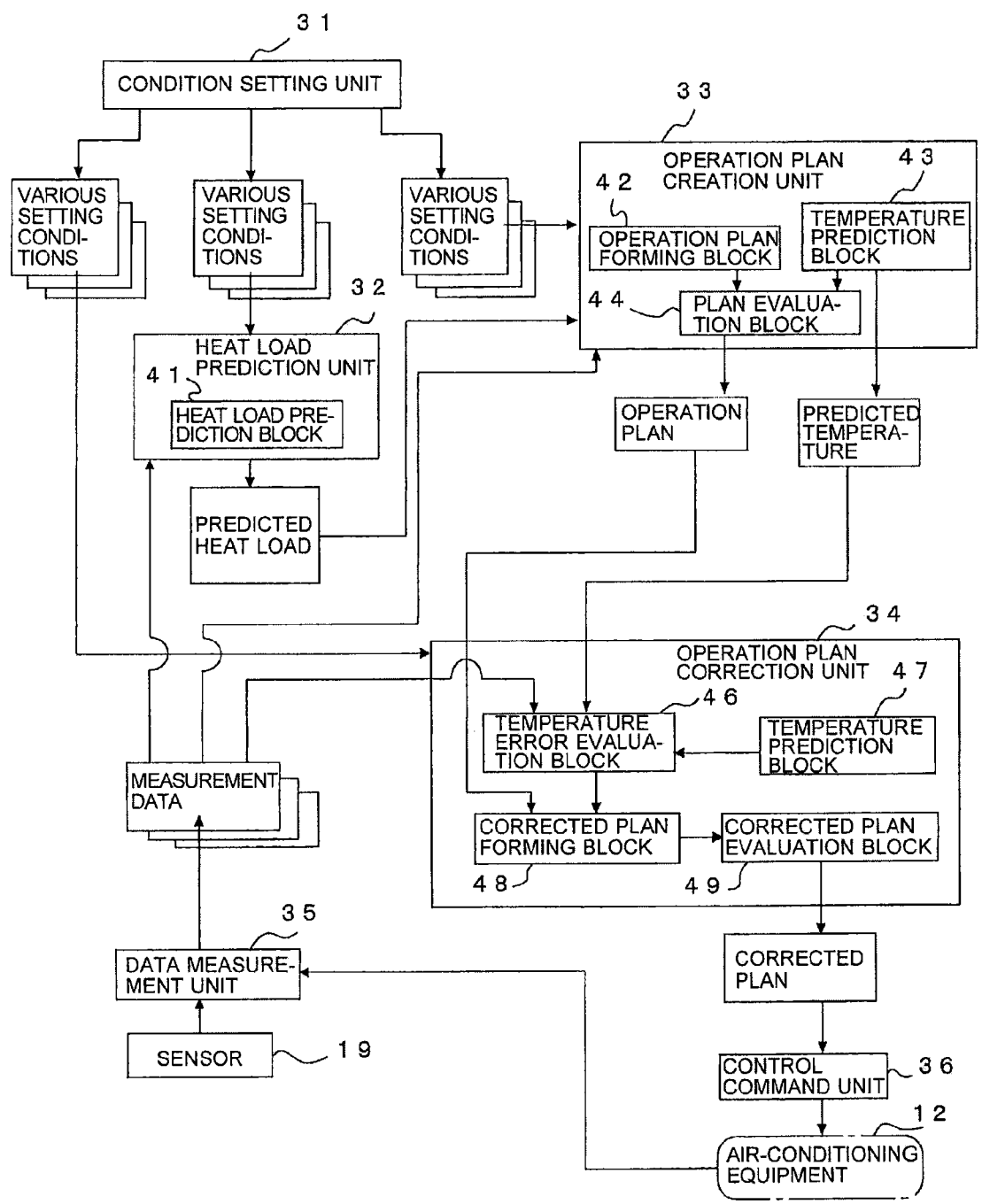

F I G. 1 4
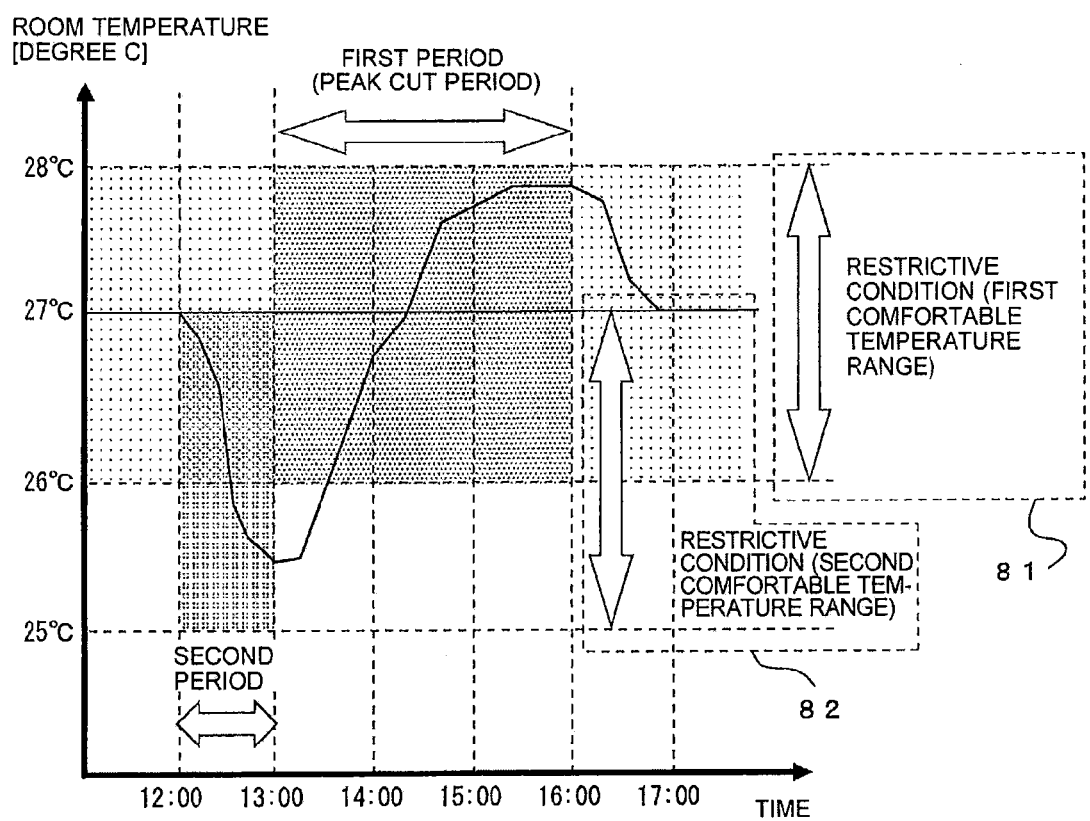

FIG. 19

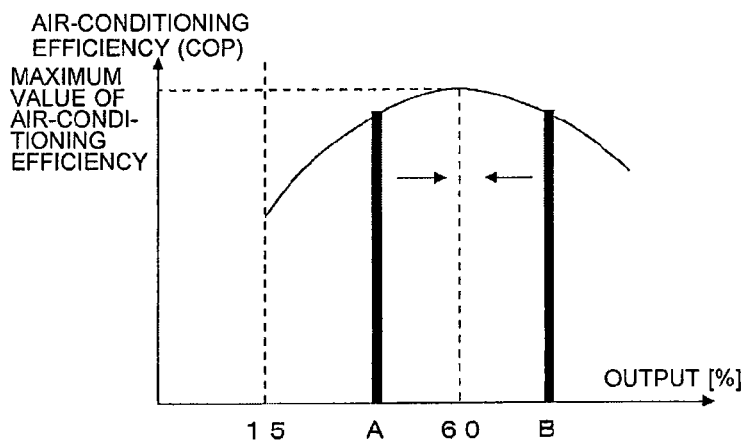

PROCESSING CONTENTS BY TIME SLOT

|  | PROCESS HEAT AMOUNT | PROCESS HEAT AMOUNT CHANGING OPERATION |
|---|---|---|
| TIME SLOT N | BELOW 60% | INCREASE OUTPUT (INCREASE AIR-CONDITIONING EFFICIENCY) |
| TIME SLOT M | NOT LIMITED | REDUCE OUTPUT |

|  | PROCESS HEAT AMOUNT | PROCESS HEAT AMOUNT CHANGING OPERATION |
|---|---|---|
| TIME SLOT N | OVER 60% | REDUCE OUTPUT (INCREASE AIR-CONDITIONING EFFICIENCY) |
| TIME SLOT M | NOT LIMITED | INCREASE OUTPUT |

PROCESSING CONTENTS BY ZONE

|  | PROCESS HEAT AMOUNT | PROCESS HEAT AMOUNT CHANGING OPERATION |
|---|---|---|
| ZONE A | BELOW 60% | INCREASE OUTPUT (INCREASE AIR-CONDITIONING EFFICIENCY) |
| ZONE ADJACENT TO ZONE A | NOT LIMITED | REDUCE OUTPUT |

|  | PROCESS HEAT AMOUNT | PROCESS HEAT AMOUNT CHANGING OPERATION |
|---|---|---|
| ZONE A | OVER 60% | REDUCE OUTPUT (INCREASE AIR-CONDITIONING EFFICIENCY) |
| ZONE ADJACENT TO ZONE A | NOT LIMITED | INCREASE OUTPUT |

PROCESSING CONTENTS BY SEGMENT

|  | PROCESS HEAT AMOUNT CHANGING OPERATION |
|---|---|
| FIRST SEGMENT | PERFORM OPERATION OF INCREASING AIR-CONDITIONING EFFICIENCY |
| SECOND SEGMENT | PERFORM OPERATION OF OFFSETTING CHANGE OF PROCESS HEAT AMOUNT IN FIRST SEGMENT |

AIR-CONDITIONING CONTROL SYSTEM AND AIR-CONDITIONING CONTROL METHOD

TECHNICAL FIELD

The present invention relates to an air-conditioning control system and an air-conditioning control method.

BACKGROUND ART

Air-conditioning equipment including an air-conditioning apparatus formed of an outdoor unit and an indoor unit, a humidifier, a dehumidifier, a heater, an outside air-conditioning unit, and so forth has been installed in buildings in the past. Such air-conditioning equipment performs energy saving control, and such energy saving control includes an air-conditioning control system that controls the air-conditioning apparatus based on heat load prediction (see Patent Literature 1, for example).

An air-conditioning control system described in Patent Literature 1 predicts the heat load of a building, forms an operation plan of an air-conditioning apparatus based on the predicted heat load, and operates the air-conditioning apparatus in accordance with the formed operation plan. Accordingly, the operation plan is created in consideration of the heat load of the building, that is, heat characteristics of the building, and the air-conditioning apparatus operates in accordance with the thus-created operation plan. Therefore, energy saving is achieved.

CITATION LIST

Patent Literature

Patent Literature 1: Japanese Unexamined Patent Application Publication No. 2011-214794 (paragraph [0077])

SUMMARY OF INVENTION

Technical Problem

According to the air-conditioning control system described in Patent Literature 1, however, the operation plan is not corrected even if the predicted heat load deviates from the actual heat load during the execution of the previously created operation plan. That is, the air-conditioning control system described in Patent Literature 1 has a problem that the previously created operation plan is not properly corrected in accordance with the state during the execution.

The present invention has been made to solve the problem as described above, and aims to provide an air-conditioning control system and an air-conditioning control method capable of properly correcting the previously created operation plan in accordance with the state during the execution.

Solution to Problem

An air-conditioning control system according to the present invention, which controls air-conditioning equipment installed in a building, includes a heat load prediction unit that predicts a change over time of a heat amount to be processed by the air-conditioning equipment based on provided heat load prediction data, an operation plan creation unit that previously creates an operation plan of the air-conditioning equipment in an air-conditioning operation plan application period to reduce one of a power consumption amount and a running cost of the air-conditioning equipment serving as an evaluation index under a first restrictive condition that a total process heat load be maintained at a same level or within a range of a predetermined amount of difference and that a temperature in a room be maintained within a predetermined comfortable temperature range, an operation plan correction unit that corrects the operation plan in a predetermined cycle during execution of control of the air-conditioning equipment in accordance with the operation plan, and a temperature sensor that measures the temperature in the room. The operation plan creation unit and the operation plan correction unit include a temperature prediction block that predicts a change over time of the temperature in the room based on provided temperature prediction data. If an actually measured temperature measured by the temperature sensor is different from a predicted temperature predicted by the operation plan creation unit at a time of creation of the operation plan, the operation plan correction unit predicts a change over time of the temperature in the room in a correction application period in the plan application period, in which correction is performed, and corrects the operation plan to minimize the evaluation index under the first restrictive condition, with a second restrictive condition set as that an error between a predicted temperature predicted by the operation plan correction unit and the predicted temperature predicted by the operation plan creation unit be maintained within a predetermined allowable fluctuation range at one time or a plurality of times in the correction application period.

Advantageous Effects of Invention

The present invention is capable of properly correcting the previously created operation plan in accordance with the state during the execution by controlling the deviation of room temperature in a predetermined period, and thus exhibits an unconventional noticeable effect of improving energy saving performance while maintaining the temperature, humidity, or the like in the room at a comfortable level.

BRIEF DESCRIPTION OF DRAWINGS

FIG. 3 is a diagram illustrating an example of a functional configuration of the air-conditioning control system 1 in Embodiment 1 of the present invention.

FIG. 14 is a diagram illustrating an example of an operation plan in Embodiment 3 of the present invention assuming a reduction of peak power.

FIG. 19 is a diagram illustrating general characteristics of an air-conditioning apparatus.

DESCRIPTION OF EMBODIMENTS

Embodiments 1 to 5 of the present invention will be described in detail below with reference to the drawings. Although steps describing a program for performing an operation of one of Embodiments 1 to 5 of the present invention are processes performed chronologically in described order, the steps may include processes that are not necessarily processed chronologically but executed in parallel or individually.

Further, functions described in Embodiments 1 to 5 are realized by hardware or software. That is, block diagrams described in Embodiments 1 to 5 may be regarded as block diagrams of hardware or functional block diagrams of software. For example, the block diagrams may be realized by hardware such as a circuit device, or may be realized by software that is executed on a not-illustrated arithmetic device such as a processor.

Further, it suffices if the functions of blocks in the block diagrams described in Embodiments 1 to 5 are implemented, and a configuration may not be separated by those blocks. That is, the blocks are only illustrative. For example, the blocks may be a superset of blocks described in Embodiments 1 to 5, a subset of blocks described in Embodiments 1 to 5, or a partial set of blocks described in Embodiments 1 to 5.

It is assumed in Embodiments 1 to 5 that items not particularly described are similar between Embodiments 1 to 5, and the same functions and configurations will be described with the same reference signs.

Further, Embodiments 1 to 5 may be implemented alone or in combination. In either case, advantageous effects described later are exhibited.

Further, examples of settings of various values, flags, and so forth described in Embodiments 1 to 5 are only illustrative, and the settings are not particularly limited thereto.

Embodiment 1

Configuration Example 1 of Air-Conditioning Control System 1

Figure 1:
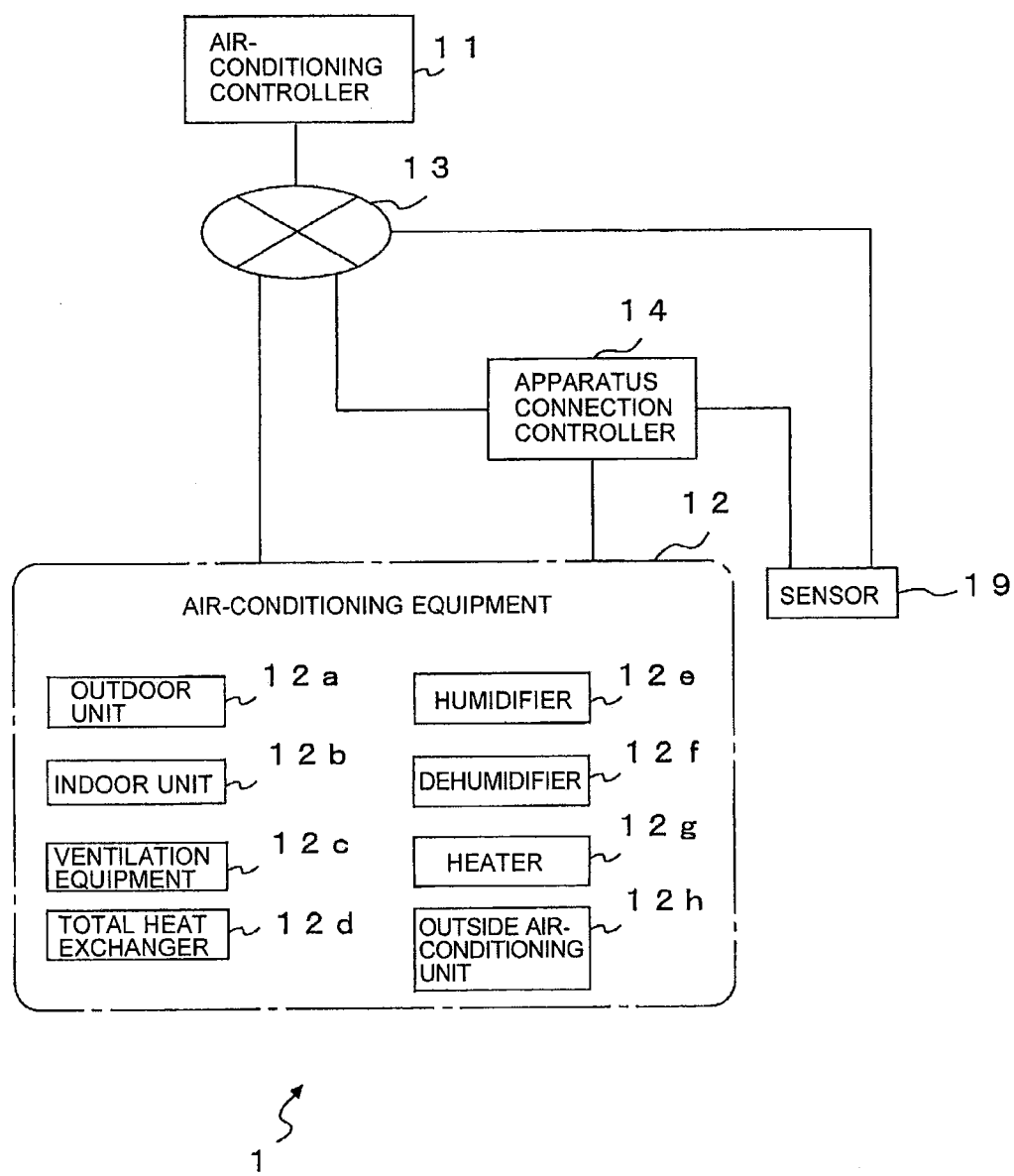
FIG. 1 is a diagram illustrating an example of a schematic configuration of an air-conditioning control system 1 in Embodiment 1 of the present invention.

FIG. 1 is a diagram illustrating an example of a schematic configuration of an air-conditioning control system 1 in Embodiment 1 of the present invention. As illustrated in FIG. 1, the air-conditioning control system 1 includes an air-conditioning controller 11 and air-conditioning equipment 12. The air-conditioning controller 11 and the air-conditioning equipment 12 are connected via an air-conditioning network 13.

The air-conditioning controller 11 controls and monitors the air-conditioning equipment 12 by performing a variety of communication with the air-conditioning equipment 12. Although FIG. 1 illustrates an example in which only one air-conditioning controller 11 is provided, the configuration is not particularly limited thereto. For example, a plurality of air-conditioning controllers 11 may be installed. Further, a plurality of air-conditioning controllers 11 may be provided at locations distant from one another. Although the air-conditioning controller 11 is usually installed in a management office or the like inside a building, for example, the installation of the air-conditioning controller 11 is not particularly limited thereto.

As illustrated in FIG. 1, the air-conditioning equipment 12 includes an outdoor unit 12a, an indoor unit 12b, ventilation equipment 12c, a total heat exchanger 12d, a humidifier 12e, a dehumidifier 12f, a heater 12g, an outside air-conditioning unit 12h, and so forth as components thereof. Each of such components is usually installed in plurality. The above-described components of the air-conditioning equipment 12 are only illustrative. The components are not particularly limited thereto, and not all of these need to be the components. Further, another type of apparatus that is not included in the above-described components of the air-conditioning equipment 12 but controls the state of the air in a room may be a component. That is, the air-conditioning equipment 12 is assumed to have one or a plurality of the above-described components of the air-conditioning equipment 12. Further, plural sets of the air-conditioning equipment 12 including a plurality of the components may be provided.

The air-conditioning network 13 may be formed as, for example, a communication medium allowing communication conforming to a communication protocol closed to the outside or a communication medium allowing communication conforming to a communication protocol open to the outside. The air-conditioning network 13 may have a configuration in which different types of networks coexist in accordance with the type of cables or the communication protocol, for example. For example, a dedicated network for measuring and controlling the air-conditioning equipment 12, a LAN (Local Area Network), and individual dedicated lines different between the components of the air-conditioning equipment 12 are conceivable as an example of the different types of networks.

The air-conditioning controller 11 and the air-conditioning equipment 12 may be configured to be connected via an apparatus connection controller 14. The apparatus connection controller 14 is implemented with a function of relaying data communication between the air-conditioning controller 11 and the air-conditioning equipment 12. For example, parts of the components of the air-conditioning equipment 12 may be configured to be directly connected to the air-conditioning network 13, and the other parts of the components of the air-conditioning equipment 12 may be configured to be connected to the apparatus connection controller 14.

Accordingly, the apparatus connection controller 14 may be caused to conceal differences in communication protocol between the air-conditioning equipment 12 and the air-conditioning controller 11 or monitor the content of communication between the air-conditioning equipment 12 and the air-conditioning controller 11.

The air-conditioning control system 1 may further include a sensor 19. The sensor 19 is a device that performs sensing, such as a temperature sensor, a humidity sensor, and a $CO_2$ concentration sensor, for example. Although FIG. 1 illustrates an example in which only one sensor 19 is installed, the configuration is not limited thereto. A plurality of sensors 19 may be installed. A plurality of devices for performing different types of sensing may be installed in the sensor 19. The sensor 19 may be a single device that performs different types of sensing. The installation location of the sensor 19 is, for example, in a room or the like as an air-conditioned space of the air-conditioning equipment 12. If the sensor 19 senses the outside air temperature, the solar radiation amount, or the like, the sensor 19 may be installed outside.

If the air-conditioning control system 1 includes the air-conditioning controller 11, as illustrated in FIG. 1, various functions described later in FIG. 3 are executed on the air-conditioning controller 11.

Although the foregoing description has been given of an example of the configuration of the air-conditioning control system 1, the configuration is not particularly limited thereto. Another example of the configuration of the air-conditioning control system 1 will be described with reference to FIG. 2.

Configuration Example 2 of Air-Conditioning Control System 1

Figure 2:
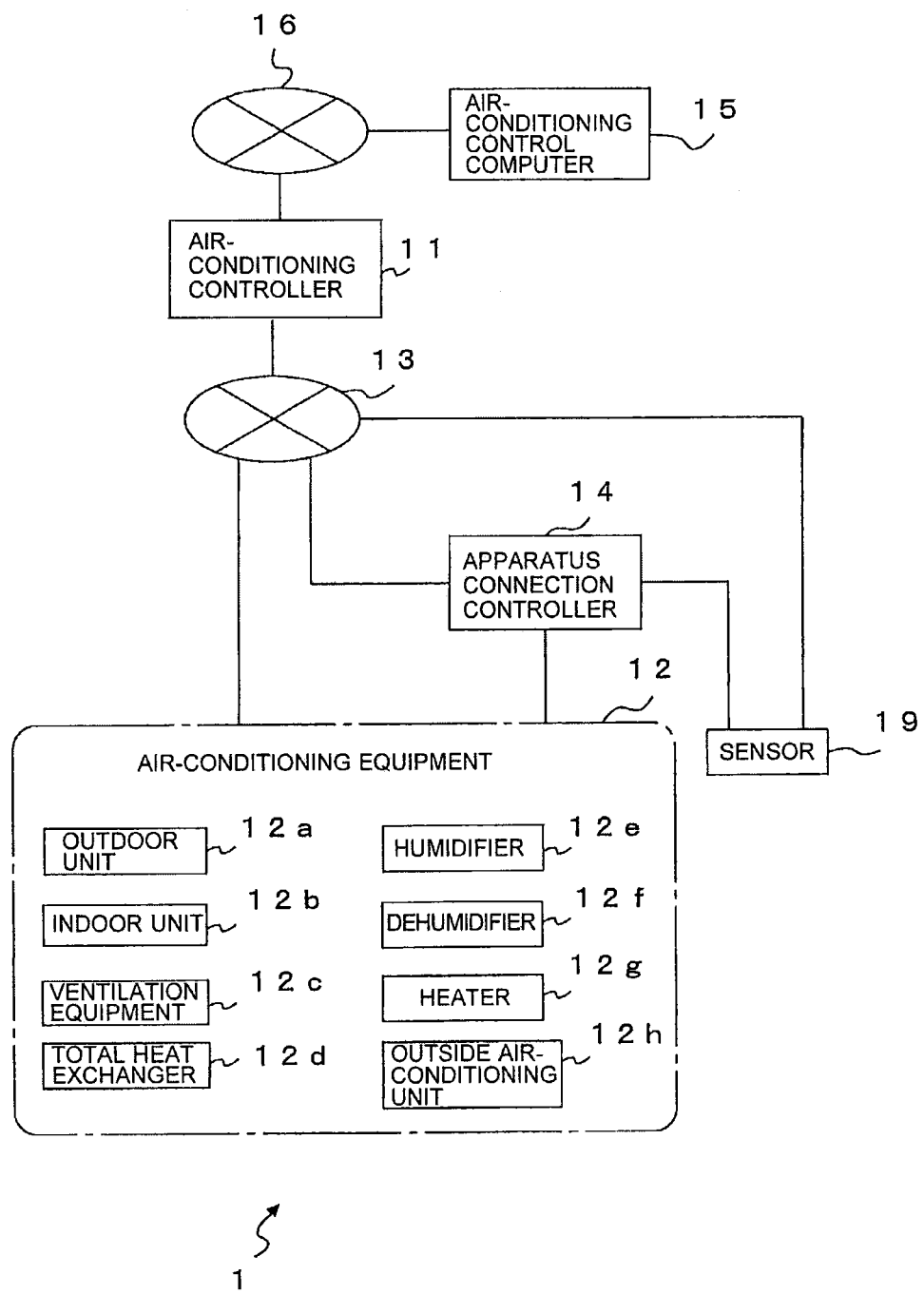
FIG. 2 is a diagram illustrating another example of the schematic configuration of the air-conditioning control system 1 in Embodiment 1 of the present invention.

FIG. 2 is a diagram illustrating another example of the schematic configuration of the air-conditioning control system 1 in Embodiment 1 of the present invention. As illustrated in FIG. 2, the air-conditioning control system 1 includes an air-conditioning control computer 15. The air-conditioning control computer 15 is connected to the air-conditioning controller 11 via a general-purpose network 16. The air-conditioning control computer 15 performs a variety of communication with the air-conditioning controller 11 via the general-purpose network 16.

The general-purpose network 16 is a communication medium conforming to a communication protocol, such as a LAN or a telephone line, for example. When the air-conditioning control computer 15 and the air-conditioning controller 11 perform a variety of communication, therefore, the variety of communication may be performed based on IP addresses or the like. Further, the air-conditioning control computer 15 may perform a variety of communication with the sensor 19 or the air-conditioning equipment 12 via the air-conditioning controller 11 or the apparatus connection controller 14.

The air-conditioning control computer 15 executes various operations by performing a variety of communication with the air-conditioning equipment 12 via the general-purpose network 16. The air-conditioning control computer 15 may acquire a variety of data by performing a variety of communication with the apparatus connection controller 14 or the sensor 19 via the general-purpose network 16, the air-conditioning controller 11, and the air-conditioning network 13, for example.

If the air-conditioning control system 1 includes the air-conditioning controller 11 and the air-conditioning control computer 15, as illustrated in FIG. 2, various functions described later in FIG. 3 may be shared by the air-conditioning controller 11 and the air-conditioning control computer 15. Similarly to the air-conditioning controller 11, the air-conditioning control computer 15 may be provided in the room or the like as the air-conditioned space of the air-conditioning equipment 12, or may be installed in a center or the like that manages a plurality of buildings at the site or from a remote site.

Although the foregoing description has been given of an example in which the respective functions are implemented in the air-conditioning controller 11 and an example in which the functions are shared by the air-conditioning controller 11 and the air-conditioning control computer 15, the configuration is not particularly limited thereto. For example, the functions of the air-conditioning controller 11 may be distributively implemented in a plurality of not-illustrated server apparatuses. Further, for example, the functions of the air-conditioning controller 11 and the functions of the air-conditioning control computer 15 may be implemented in logically different forms in a single not-illustrated server apparatus. That is, it suffices if each of the above-described functions is executed. Thus, the physical storage location or the physical execution location thereof is not particularly limited.

For example, the above-described functions may be distributively processed by a plurality of server apparatuses or the like provided at remote sites, and a series of processes may be executed with operation results synchronized with one another. Further, two functions may be implemented in a single server apparatus caused to function as an apparatus that virtualizes the functions of the air-conditioning controller 11 and the functions of the air-conditioning control computer 15 in logically different forms, as described above.

(Functional Block Diagram: Overview)

The functions implemented in the above-described air-conditioning control system 1 will now be described with reference to FIG. 3. FIG. 3 is a diagram illustrating an example of a functional configuration of the air-conditioning control system 1 in Embodiment 1 of the present invention.

As illustrated in FIG. 3, the air-conditioning control system 1 includes a condition setting unit 31, a heat load prediction unit 32, an operation plan creation unit 33, an operation plan correction unit 34, a data measurement unit 35, a control command unit 36, and so forth as a functional configuration thereof.

The condition setting unit 31 sets an application period of an air-conditioning operation plan, time intervals, a comfortable temperature range, a set temperature, and so forth as various setting conditions to be input to the heat load prediction unit 32, the operation plan creation unit 33, and the operation plan correction unit 34. In accordance with the various setting conditions acquired from the condition setting unit 31, the heat load prediction unit 32 predicts an air-conditioning apparatus heat supply amount that satisfies the set temperature in the application period, that is, the heat load at the set time intervals.

In accordance with the various setting conditions acquired from the condition setting unit 31, the operation plan creation unit 33 creates, at the set time intervals, the operation plan of the air-conditioning equipment 12 that processes the heat load predicted by the heat load prediction unit 32 in the application period. In accordance with the various setting conditions acquired from the condition setting unit 31, the operation plan correction unit 34 corrects the operation plan created by the operation plan creation unit 33 based on the deviation of a predicted temperature from the result of measurement by the data measurement unit 35. The control command unit 36 transmits the operation plan corrected by the operation plan correction unit 34 to the air-conditioning equipment 12.

(Detailed Description of Functional Block Diagram)

Details of the respective units will be described below.

(Condition Setting Unit 31)

The condition setting unit 31 sets the various setting conditions, such as the air-conditioning operation plan application period, the time intervals, the comfortable temperature range, and the set temperature, which are execution conditions for the heat load prediction unit 32, the operation plan creation unit 33, and the operation plan correction unit 34. The condition setting unit 31 sets, as various setting conditions necessary for predicting the heat load and the temperature, the outside air temperature, the solar radiation amount, the internal heat generation amount, characteristics of the apparatuses as the components of the air-conditioning equipment 12 and the connection relationship therebetween, the arrangement in a floor of the apparatuses as the components of the air-conditioning equipment 12, and so forth. Further, a comfort maintenance period may be set in the plan application period as a period in which room temperature is maintained within the comfortable temperature range.

The condition setting unit 31 may set the various setting conditions in accordance with manual setting by a manager or the like of the building, for example. Further, the condition setting unit 31 may automatically set the various setting conditions in accordance with default settings previously determined as initial values. Therefore, the execution time of the air-conditioning control system 1 may be controlled in accordance with manual setting by the manager of the building, for example. Specifically, the manager of the building may stop the execution of the air-conditioning control system 1 on a specific day. Further, the manager of the building may interrupt the execution of the air-conditioning control system 1. That is, the execution time of the air-conditioning control system 1 is arbitrarily controlled by external setting. For example, previously provided input means such as a keyboard, a mouse, a touch panel, and various switches and display means such as a display may be used as an interface for external setting.

(Heat Load Prediction Unit 32)

The heat load prediction unit 32 includes a heat load prediction block 41. Based on various input data as the various setting conditions, the heat load prediction block 41 predicts the change over time of the heat amount to be processed by the air-conditioning equipment 12 during the plan application period. The various input data includes the set temperature of the air-conditioning equipment 12 during the plan application period, meteorological data, and internal heat generation data, for example. The meteorological data is data including at least one of the outside air temperature and the solar radiation amount. The internal heat generation data is data related to the heat generated inside the building.

In the heat load prediction block 41, a heat load prediction model modeled on heat characteristics of the building is implemented. The heat load prediction model is a mathematical formula model based on a heat conduction equation, for example. The heat load prediction model is derivable from a room temperature prediction model defined by a heat conduction equation. For example, the heat load prediction model is derived by converting the equation to switch the air-conditioning apparatus heat supply amount as one of inputs and the room temperature as the output. The heat load prediction model is not required to be defined based on the heat conduction equation. For example, the heat load prediction model is not particularly limited, as long as the model allows the heat load to be predicted from available input data.

(Operation Plan Creation Unit 33)

The operation plan creation unit 33 creates, within a predetermined calculation time, the operation plan of the air-conditioning equipment 12 to minimize one of a power consumption amount and a running cost as an evaluation index in the plan application period under a restrictive condition such as that the temperature in the room be maintained within a predetermined comfortable temperature range. To realize this function, the operation plan creation unit 33 includes an operation plan forming block 42, a temperature prediction block 43, and a plan evaluation block 44.

The operation plan forming block 42 forms various operation patterns different between the apparatuses as the components of the air-conditioning equipment 12. The temperature prediction block 43 predicts the change over time of the temperature in the room based on provided first temperature prediction data. The plan evaluation block 44 determines whether or not each of the operation patterns formed by the operation plan forming block 42 satisfies the restrictive condition set by the condition setting unit 31, calculates the value of the evaluation index, and determines whether or not to set the operation pattern as the operation plan to be output ultimately based on the calculated evaluation index. Details of the temperature prediction block 43 will now be described. The temperature prediction block 43 corresponds to a first temperature prediction block of the present invention.

(Temperature Prediction Block 43)

The temperature prediction block 43 predicts the change over time of the temperature in the room in the plan application period from the operation pattern, meteorological data, and internal heat generation data as input data. The operation pattern is the operation pattern of the air-conditioning equipment 12 in the plan application period. The meteorological data is data including at least one of the outside air temperature and the solar radiation amount. The internal heat generation data is data of heat generation occurring inside the building. In the temperature prediction block 43, a room temperature prediction model is implemented which is modeled on heat characteristics of the building, for which the change over time of the temperature in the room is predicted. The room temperature prediction model is a mathematical formula model based on heat conduction equations in formulae (1) to (3) expressed as follows, for example. The temperature in the room as the output is obtained by providing the input data to such heat conduction equations.

[Math. 1]

$$C_1 \frac{dT_1}{dt} = \beta Q_s + \frac{(T_o - T_1)}{R_1} - \frac{(T_1 - T_2)}{R_2} \quad (1)$$

$$C_2 \frac{dT_2}{dt} = \alpha Q_s + \mu Q_{occ} + \lambda Q_{EQP} + \frac{(T_1 - T_2)}{R_2} - \frac{(T_2 - T_z)}{R_z} \quad (2)$$

$$C_z \frac{dT_z}{dt} = \delta Q_{HVAC} + \rho Q_{occ} + \gamma Q_{EQP} + \frac{(T_o - T_z)}{R_3} - \frac{(T_2 - T_z)}{R_z} - \frac{(T_z - T_{oz})}{R_{oz}} \quad (3)$$

In formulae (1) to (3), $Q_S$ represents the solar radiation amount [kW], $Q_{OCC}$ represents a human body heat generation amount [kW], $Q_{EQP}$ represents an apparatus heat generation amount [kW], and $Q_{HVAC}$ represents the air-conditioning apparatus heat supply amount [kW].

Further, $T_O$ represents the outside air temperature [K], $T_1$ represents an outdoor side outer wall surface temperature [K], $T_2$ represents an indoor side outer wall surface temperature [K], $T_Z$ represents an indoor temperature [K], and $T_{OZ}$ represents the temperature [K] of an adjacent zone.

$R_1$ represents an outdoor side outer wall surface thermal resistance [K/kW], $R_2$ represents an outer wall thermal resistance [K/kW], $R_Z$ represents an indoor side outer wall surface resistance [K/kW], $R_{OZ}$ represents a thermal resistance [K/kW] between the adjacent zone, and $R_3$ represents a thermal resistance [K/kW] other than the thermal resistance of the outer wall.

$C_1$ represents an outdoor side outer wall thermal capacity [kJ/K], $C_2$ represents an indoor side outer wall thermal capacity [kJ/K], and $C_Z$ represents an indoor thermal capacity [kJ/K].

α represents a correction coefficient [–] of a solar radiation amount passing through into the room, β represents a correction coefficient [–] of a solar radiation amount radiating onto the outer wall, γ represents a correction coefficient [–] of the apparatus heat generation amount affecting the indoor temperature, δ represents a correction coefficient [–] of the air-conditioning apparatus heat supply amount, ρ represents a correction coefficient [–] of the human body heat generation amount affecting the indoor temperature, μ represents a correction coefficient [–] of the human body heat generation amount affecting the indoor side outer wall surface temperature, and λ represents a correction coefficient [–] of the apparatus heat generation amount affecting the indoor side outer wall surface temperature.

In formulae (1) to (3), a case is assumed in which there is only one adjacent zone. If there is contact with a plurality of zones, however, the formulae may be changed to provide $T_{OZ}$ and $R_{OZ}$ to each of the corresponding zones. Although formulae (1) to (3) deal with one zone, individual mathematical formula models may be used for the respective zones. Further, a mathematical formula model for the entire air-conditioning-controlled area may be derived by deriving formulae dealing with all zones and combining the derived formulae.

Although the heat conduction equations include unknown parameters such as the thermal resistance, the thermal capacity, and the correction coefficient, from formulae (1) to (3), the method of estimating these is not particularly limited. For example, values calculated from structural data of the building, that is, building data such as the material of walls, the thickness of the walls, the area of the walls, and the size of the room, may be provided to the heat conduction equations expressed by formulae (1) to (3). Further, the input-output relationship may be derived by, for example, converting the heat conduction equations into a canonical form of the state-space model or the like used in control theory and system identification and using the form as a black box model or a gray box model based on measurement data. The room temperature prediction model is not necessarily required to be the mathematical formula model based on the heat conduction equations. For example, the room temperature prediction model is not particularly limited, as long as the model allows the temperature in the room to be predicted from available input data.

The creation of the operation plan will now be described on the assumption of the above-described functional configuration of the operation plan forming block 42, the temperature prediction block 43, and the plan evaluation block 44. Firstly, the time at which the operation plan of the air-conditioning equipment 12 is created by the operation plan creation unit 33 will hereinafter be referred to as the plan creation time. As described above, the plan application period is one of the various setting conditions set by the condition setting unit 31, includes a time after the plan creation time, and represents a certain time slot. The above-described predetermined calculation time is one of the various setting conditions set by the condition setting unit 31, and represents a time preceding the start of the plan application period by a sufficient time interval without affecting the measurement and control of the air-conditioning equipment 12.

For example, the plan creation time is herein assumed to be 21 o'clock the day before the execution of the control. Further, the plan application period is assumed to be from 0 o'clock to 24 o'clock on the day of execution of the control. That is, a description will be given of a case in which the operation plan of the air-conditioning equipment 12 for the next day is created at 21 o'clock every day. The plan is not necessarily required to be created the previous day. If the time slot for actually controlling the air-conditioning equipment 12 is from 8:00 to 22:00, for example, the plan creation time may be set to, for example, 2:00 in the morning of the day of execution of the control. That is, the creation of the operation plan is executed in a preset operation plan creation cycle, and is executed every day, for example. However, the creation of the operation plan is not particularly limited thereto.

The operation plan corresponds to planned values of time-series control commands for the air-conditioning equipment 12. The command item varies depending on the equipment to be controlled. Further, the item may vary depending on the model of the same type of equipment. For example, if the equipment to be controlled is the outdoor unit 12a, a compressor frequency [Hz] at time intervals of 5 minutes is an example of the command item. If the equipment to be controlled is the heater 12g, a binary state signal between the ON state and the OFF state at time intervals of 5 minutes is an example of the command item. However, the compressor frequency [Hz] and the binary state signal between the ON state and the OFF state are merely illustrative. Thus, the command item to the outdoor unit 12a may be the output [%], a performance save rate [%], or another item, for example. Further, the command item to the heater 12g may be the output [%] or another item. Further, if the equipment to be controlled is the indoor unit 12b, the set temperature may be an example of the command item.

Although the 5-minute intervals have been described as an example of the time intervals of the control commands, the time intervals may be 10-minute intervals or 15-minute intervals, for example, in accordance with the system configuration in actual operation and the restrictive condition, such as the processing capacity of the air-conditioning controller 11, the processing capacity of the air-conditioning control computer 15, and the number of items of equipment to be controlled, and are not limited to the 5-minute intervals.

An overview of the evaluation index will now be described. Firstly, a main purpose of the air-conditioning control system 1 is to perform energy saving control of the air-conditioning equipment 12. Therefore, the most typical index is adopted here as the evaluation index. Specifically, the air-conditioning control system 1 adopts the power consumption amount as the evaluation index, and creates the operation plan for minimizing the power consumption amount over the entire plan application period of the air-conditioning equipment 12.

An overview of the restrictive condition will now be described. A description will be given of a case assuming the restrictive condition as that the temperature in the room be maintained within the preset comfortable temperature range. The preset comfortable temperature range is set by the condition setting unit 31. For example, the set temperature±1 [degree Celsius] is herein assumed to be the preset comfortable temperature range. Whether or not the operation plan satisfies such a temperature restrictive condition related to the temperature in the restrictive condition is determined by the plan evaluation block 44 based on the result of prediction by the temperature prediction block 43.

A problem solving method itself executed by the operation plan creation unit 33 is not particularly limited. For example, the operation plan creation unit 33 may generalize a problem to solve an optimization problem converted with a quadratic programming problem or the like. Further, the operation plan creation unit 33 may solve a problem by using a specific solving method limited to the targeted air-conditioning control system 1. In any case, the operation plan creation unit 33 may solve the problem of minimizing the evaluation index under the above-described restrictive condition.

(Operation Plan Correction Unit 34)

The operation plan correction unit 34 will now be described. In the execution of the control of the air-conditioning equipment 12, the operation plan correction unit 34 corrects the operation plan created by the operation plan creation unit 33 in accordance with preset correction rules. To realize this function, the operation plan correction unit 34 includes a temperature error evaluation block 46, a temperature prediction block 47, a corrected plan forming block 48, and a corrected plan evaluation block 49, as illustrated in FIG. 3.

The temperature error evaluation block 46 evaluates the error between the predicted temperature as the result by the operation plan creation unit 33 and the measurement data of the data measurement unit 35. The temperature prediction block 47 predicts the change over time of the temperature in the room based on provided second temperature prediction data. The corrected plan evaluation block 49 forms various corrected patterns of the operation plan of the air-conditioning equipment 12. The corrected plan evaluation block 49 determines whether or not each of the formed corrected patterns satisfies the restrictive condition, calculates the value of the evaluation index, and determines whether or not to set the corrected pattern as the corrected plan to be output ultimately based on the calculated value of the evaluation index. The temperature prediction block 47 corresponds to the second temperature prediction block of the present invention. Details of the temperature prediction block 47 will now be described.

(Temperature Prediction Block 47)

The temperature prediction block 47 may have a functional configuration the same as or different from that of the temperature prediction block 43. For example, the temperature prediction block 47 may determine the range of change in the output of an air-conditioning apparatus required to change the temperature by 1 [degree Celsius] based on characteristics of the air-conditioning apparatus or the thermal resistance, the thermal capacity, and so forth in the above-described heat conduction equations, and simply predict the temperature based on the determined range of change in the output of the air-conditioning apparatus.

(Data Measurement Unit 35)

The data measurement unit 35 measures operation data of the air-conditioning equipment 12 and supplies measurement results to the heat load prediction unit 32, the operation plan creation unit 33, the operation plan correction unit 34, and so forth. The data measurement unit 35 further supplies the measurement results to the temperature prediction block 43 of the operation plan creation unit 33 and the temperature prediction block 47 of the operation plan correction unit 34. The data measurement unit 35 may measure various data necessary for the heat load prediction model implemented in the heat load prediction unit 32 and supply measurement results to the heat load prediction unit 32. Further, the data measurement unit 35 may measure various data necessary for the room temperature prediction model implemented in each of the temperature prediction block 43 and the temperature prediction block 47 and supply measurement results to each of the temperature prediction block 43 and the temperature prediction block 47.

Further, if necessary, the data measurement unit 35 may measure various data from the sensor 19 configured independently of the air-conditioning equipment 12, such as a temperature sensor in the room, a humidity sensor in the room, a $CO_2$ concentration sensor in the room, an outside air temperature sensor, and a solar radiation amount sensor.

The data measurement unit 35 executes the measurement in a preset cycle, such as a data measurement cycle, for example. The data measurement cycle is a 5-minute cycle, for example.

(Control Command Unit 36)

The control command unit 36 transmits the control commands corresponding to the operation plan corrected by the operation plan correction unit 34 to the air-conditioning equipment 12 in a preset cycle, such as a control command execution cycle, for example. The control command execution cycle is a 5-minute cycle, for example.

As a basic rule in the preset correction rules, the correction of the operation plan is executed in a preset operation plan correction cycle, such as a 30-minute cycle, for example. Specifically, the correction of the operation plan is executed at 25 minutes and 55 minutes past every hour.

Further, a description will be given on the assumption that the operation plan correction application period is 2 hours, for example. As a result of such settings, the correction of the operation plan for 10:00 to 12:00 is executed at 9:55, for example. However, the operation plan for 10:00 to 12:00 may be the exact plan created the previous day, or may be the result of correction of the operation plan executed in the immediately preceding correction, that is, executed at 9:25 for 9:30 to 11:30.

Hereinafter, the operation plan subjected to the correction will also be simply referred to as the operation plan, unless otherwise specified. The 30-minute cycle as the operation plan correction cycle and 2 hours as the operation plan correction application period are only illustrative, and the operation plan correction cycle and the operation plan correction application period are not particularly limited thereto. For example, the operation plan correction cycle may be a 15-minute cycle. Further, a criterion for determining whether or not to execute the correction may be set by the condition setting unit 31, and the correction may be executed only when necessary based on the set determination criterion.

Herein, as a preset correction rule, whether or not the temperature corresponding to one time or a plurality of times included in the correction application period falls within a preset range of difference from the temperature corresponding to the same time or times predicted at the time of creation of the operation plan is set as a restrictive condition, in addition to the restrictive condition at the time of creation of the operation plan. That is, whether or not the temperature corresponding to one time or a plurality of times included in the correction application period falls within an allowable temperature fluctuation range of the temperature corresponding to the same time or times predicted at the time of creation of the operation plan is set as a restrictive condition.

Also herein, the operation plan in the correction application period is corrected within a preset calculation time to minimize or maximize the preset evaluation index within a preset target setting range in the correction application period.

In this process, temperature data measured by the data measurement unit 35 is used as the temperature at the time of execution of the correction. The temperature data may be the measurement value of a temperature sensor included in the indoor unit 12b, for example, in the components of the air-conditioning equipment 12. The data measured by the temperature sensor included in the indoor unit 12b is the inlet temperature of the indoor unit 12b, for example. Further, the temperature data may be the measurement value of the sensor 19 installed in the room separately from the air-conditioning equipment 12.

The preset evaluation index is assumed to be the same as that at the time of creation of the operation plan. However, the application period is the plan application period when the operation plan is created, while the application period is the correction application period when the operation plan is corrected. In this regard, there is a difference from the creation of the operation plan. Further, the operation plan correction unit 34 performs the correction to minimize the power consumption amount in the correction application period. Further, as described above, the preset calculation time in the operation plan correction unit 34 is assumed to be up to 5 minutes, when the execution time is set to 25 minutes and 55 minutes past every hour, for example. It is conceivable that the execution of the correction of the operation plan may take more than 5 minutes depending on the limitation of the computational capacity of a processor or the like. If the correction of the operation plan thus takes a certain length of time, the various setting conditions in the condition setting unit 31 may be changed in accordance with the required time.

Figure 4:
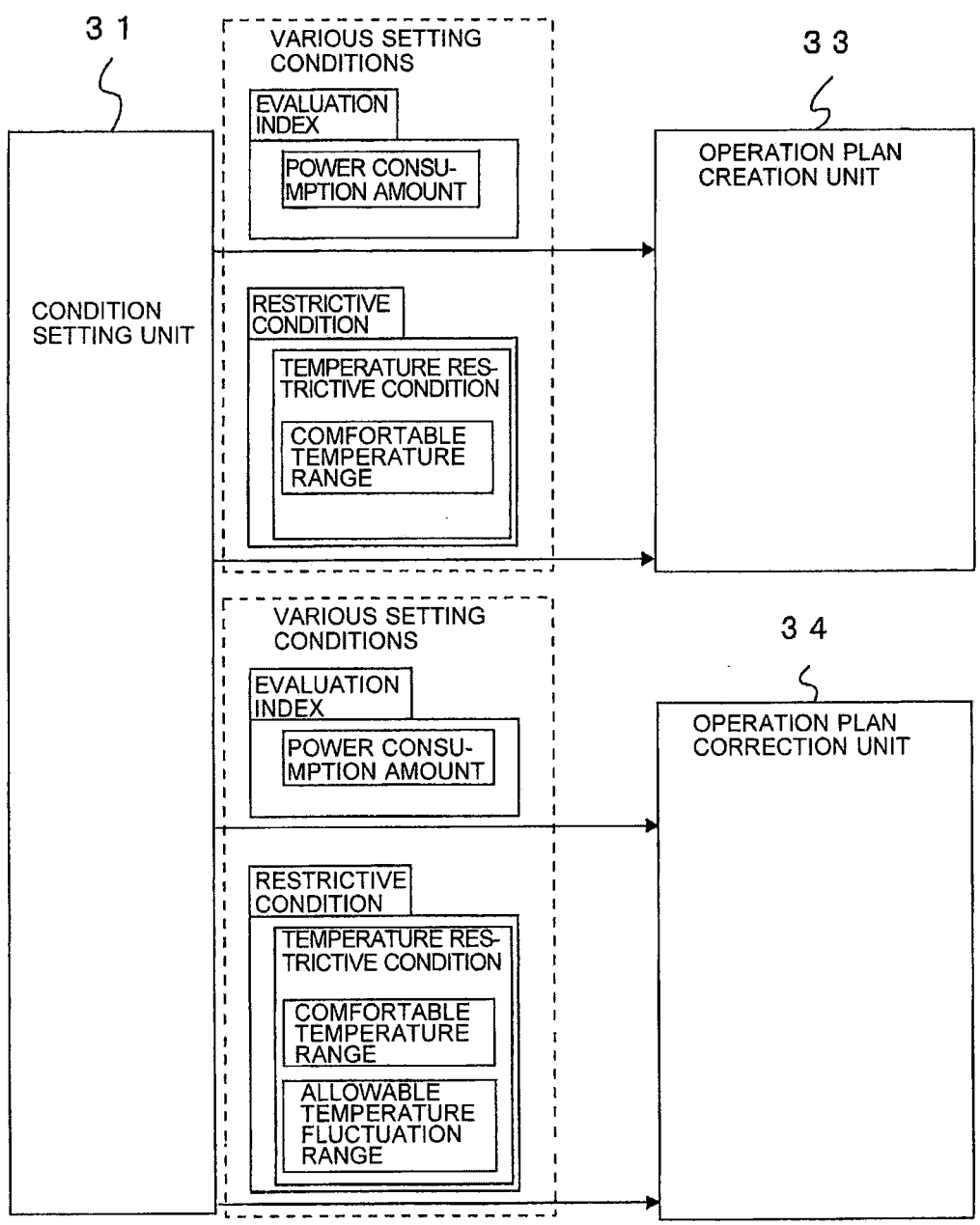
FIG. 4 is a diagram illustrating an example of various setting conditions in Embodiment 1 of the present invention.

Herein, with reference to FIG. 4, a description will be given of an example in which the various setting conditions set by the condition setting unit 31 are set in the operation plan creation unit 33 and the operation plan correction unit 34. FIG. 4 is a diagram illustrating an example of the various setting conditions in Embodiment 1 of the present invention. For example, as illustrated in FIG. 4, the evaluation index and the restrictive condition set by the condition setting unit 31 are supplied to each of the operation plan creation unit 33 and the operation plan correction unit 34 as the various conditions.

The evaluation index is the power consumption amount, for example. The restrictive condition is the temperature restrictive condition, for example. For example, the comfortable temperature range and the allowable temperature fluctuation range are set as the temperature restrictive condition.

Figure 5:
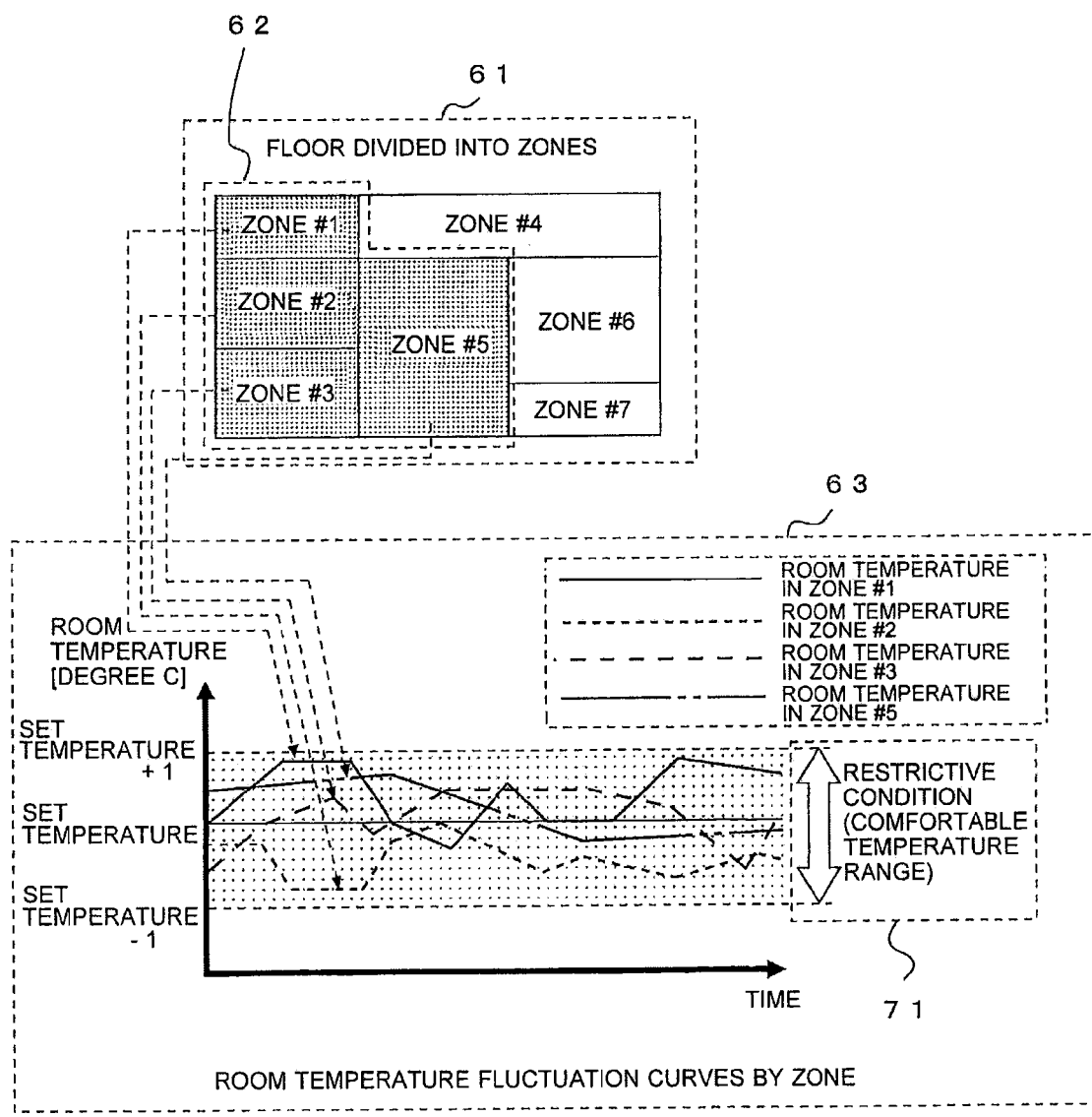
FIG. 5 is a diagram illustrating an example of a state of spatial variation of room temperature in Embodiment 1 of the present invention.
Figure 6:
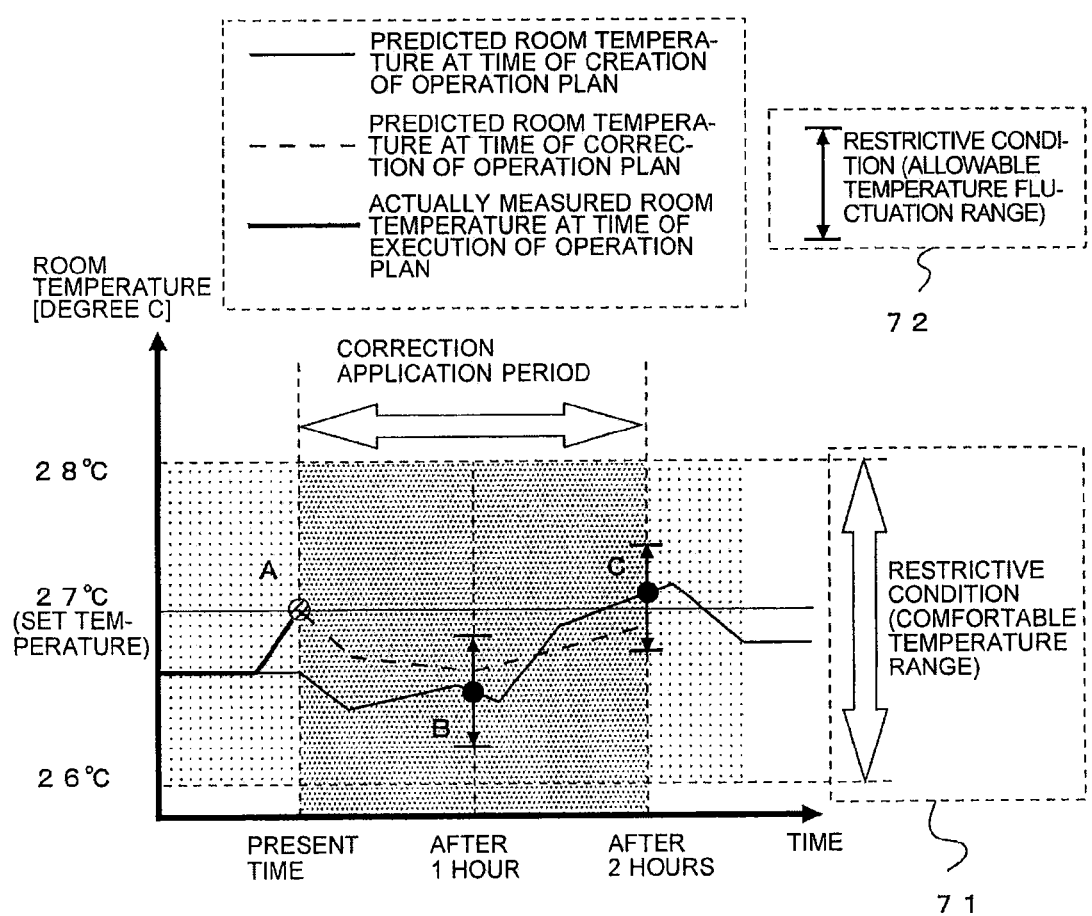
FIG. 6 is a diagram illustrating an example of a state of temporal variation of room temperature in Embodiment 1 of the present invention.

With reference to FIGS. 5 and 6, a description will now be given of an operation plan assuming a state of spatial variation of the temperature in the room, that is, the room temperature, and a state of temporal variation of the temperature in the room, that is, the room temperature. FIG. 5 is a diagram illustrating an example of the state of spatial variation of the room temperature in Embodiment 1 of the present invention. FIG. 6 is a diagram illustrating an example of the state of temporal variation of the room temperature in Embodiment 1 of the present invention.

A description will first be given of the operation plan of the air-conditioning equipment 12 created by the operation plan creation unit 33 and the predicted temperature predicted by the temperature prediction block 43 on the assumption that the air-conditioning equipment 12 is operated in accordance with the created operation plan.

The predicted temperature changes within the range of the restrictive condition, but does not necessarily follow the set temperature. This is because, in the operation plan created by the operation plan creation unit 33, the heat load to be processed is dispersed temporally and spatially to efficiently process the heat load. The meaning of temporally dispersing the heat load will be described. For example, the outdoor unit 12a is caused to perform an operation in which the heat load generated at each time is processed not only at the time but also at times slightly preceding and following the time. That is, temporally dispersing the heat load means an operation of causing the heat load not to be processed at a single target time but to be distributively processed at a plurality of target times.

With the execution of this operation, it is possible to operate the outdoor unit 12a at points of the highest possible efficiency. Consequently, temporal variation occurs in the room temperature.

The meaning of spatial dispersion will now be described. For example, it is assumed that there are a plurality of outdoor units 12a. In this case, respective zones covered by the outdoor units 12a are adjacent to one another. Accordingly, heat transfer to adjacent zones is expected. That is, spatially dispersing the heat load means an operation of causing the heat load not to be processed in a single zone but to be distributively processed in a plurality of zones.

In the present invention, an area allocated to each of the plurality of outdoor units 12a will be described as one zone. That is, it is assumed that there are as many zones as the number of the outdoor units 12a. The method of dividing a space into zones, however, is not limited to such a method.

With the execution of this operation, spatial variation occurs in the room temperature, as illustrated in FIG. 5, for example. As illustrated in FIG. 5, in a floor 61 divided into zones, zone #2 is adjacent to zone #1, zone #3, and zone #5. That is, the zones adjacent to zone #2 are zone #1, zone #3, and zone #5. Focusing on room temperature fluctuation curves 63 by zone, the respective zones have different room temperatures, that is, spatial variation is caused, but the room temperatures in the respective zones change within a restrictive condition 71 corresponding to the comfortable temperature range. Accordingly, the restrictive condition 71 is satisfied in all of the zones.

That is, the state of temporal and spatial variations of the temperature in the room is meaningful in the plan at the time of creation of the operation plan. Therefore, the correction of the operation plan is executed to follow the state of variation at the time of creation of the operation plan. As illustrated in FIG. 6, the room temperature at the present time is represented as point A. Point A matches the set temperature, and it is unnecessary to correct the operation plan from a normal way of thinking. However, the room temperature is slightly higher than the predicted temperature at the time of creation of the operation plan. Thus, the operation plan is corrected with the correction application period being assumed to range from the present time to the time after 2 hours.

In this process, a restriction is set as that the predicted temperature at the time after 1 hour and the time after 2 hours, for example, obtained as a result of the correction falls within a preset range of difference as compared with the predicted temperature at the time of creation of the operation plan. That is, a restriction is set as that the predicted temperature obtained as a result of the correction satisfies a restrictive condition 72 corresponding to the allowable temperature fluctuation range as compared with the predicted temperature at the time of creation of the operation plan.

Although a description will be given of a case in which there are two points after 1 hour and after 2 hours, the points are not particularly limited thereto. For example, there may be only one point after 2 hours, or there may be three or more points.

Specifically, it is assumed that point B represents the predicted temperature for the time after 1 hour at the time of creation of the operation plan, and that point C represents the predicted temperature for the time after 2 hours at the time of creation of the operation plan. For example, point B is assumed to be 26.5 [degrees Celsius], and point C is assumed to be 27.1 [degrees Celsius]. If the preset difference is set to 0.2 [degrees Celsius], that is, if the allowable temperature fluctuation range is set to 0.4 [degrees Celsius], the operation plan is corrected to minimize the power amount to be consumed during the 2 hours while maintaining the temperature within a range of 26.3 to 26.7 [degrees Celsius] at point B and a range of 26.9 to 27.3 [degrees Celsius] at point C.

A description will be given of the effectiveness of the operation assuming such a state of temporal variation. A precooling operation or a preheating operation will be described as an example. In general, one of time slots in which the outdoor unit 12a operates inefficiently in an office building is work starting hours in the morning. For example, in summer, cooling with a high output is necessary in work starting hours in the morning, and the outdoor unit 12a operates with an inefficient output. The precooling operation refers to starting cooling before work starting hours in the morning. Since the precooling operation allows the outdoor unit 12a to operate with an efficient, intermediate output during an efficient time in which the outside air temperature is low, energy saving is achieved. The operation plan creation unit 33 plans such an operation of the air-conditioning apparatus.

Figure 7A:
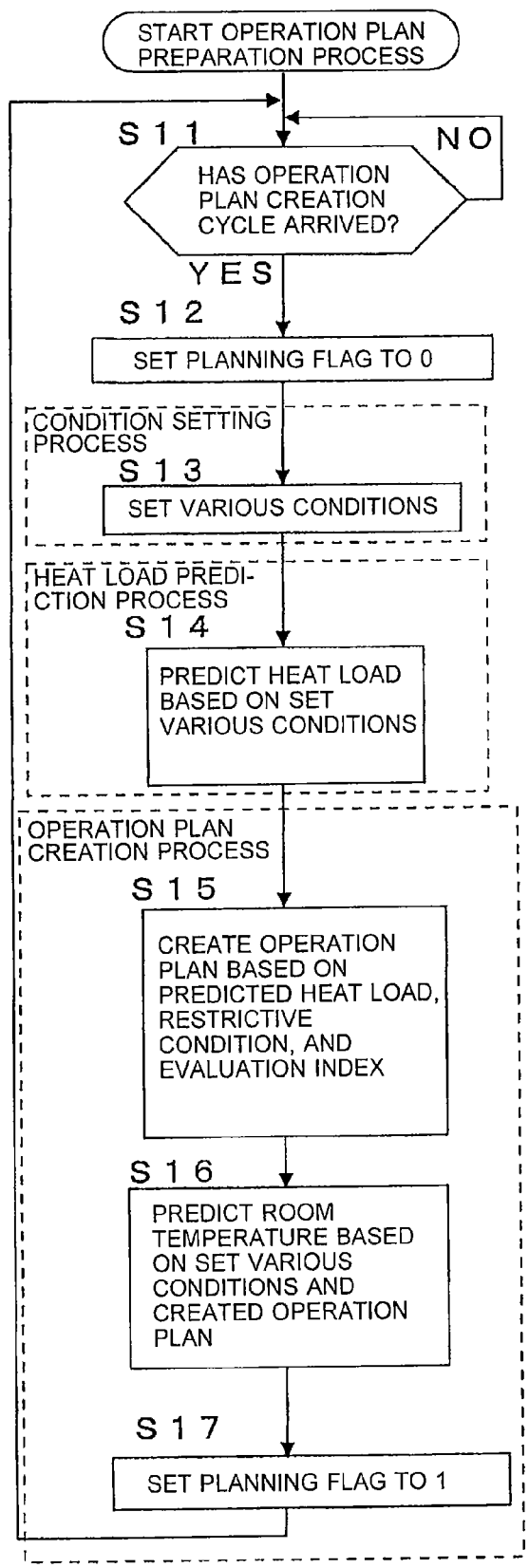
FIG. 7A is a flowchart illustrating a control example of the air-conditioning control system 1 in Embodiment 1 of the present invention.
Figure 7B:
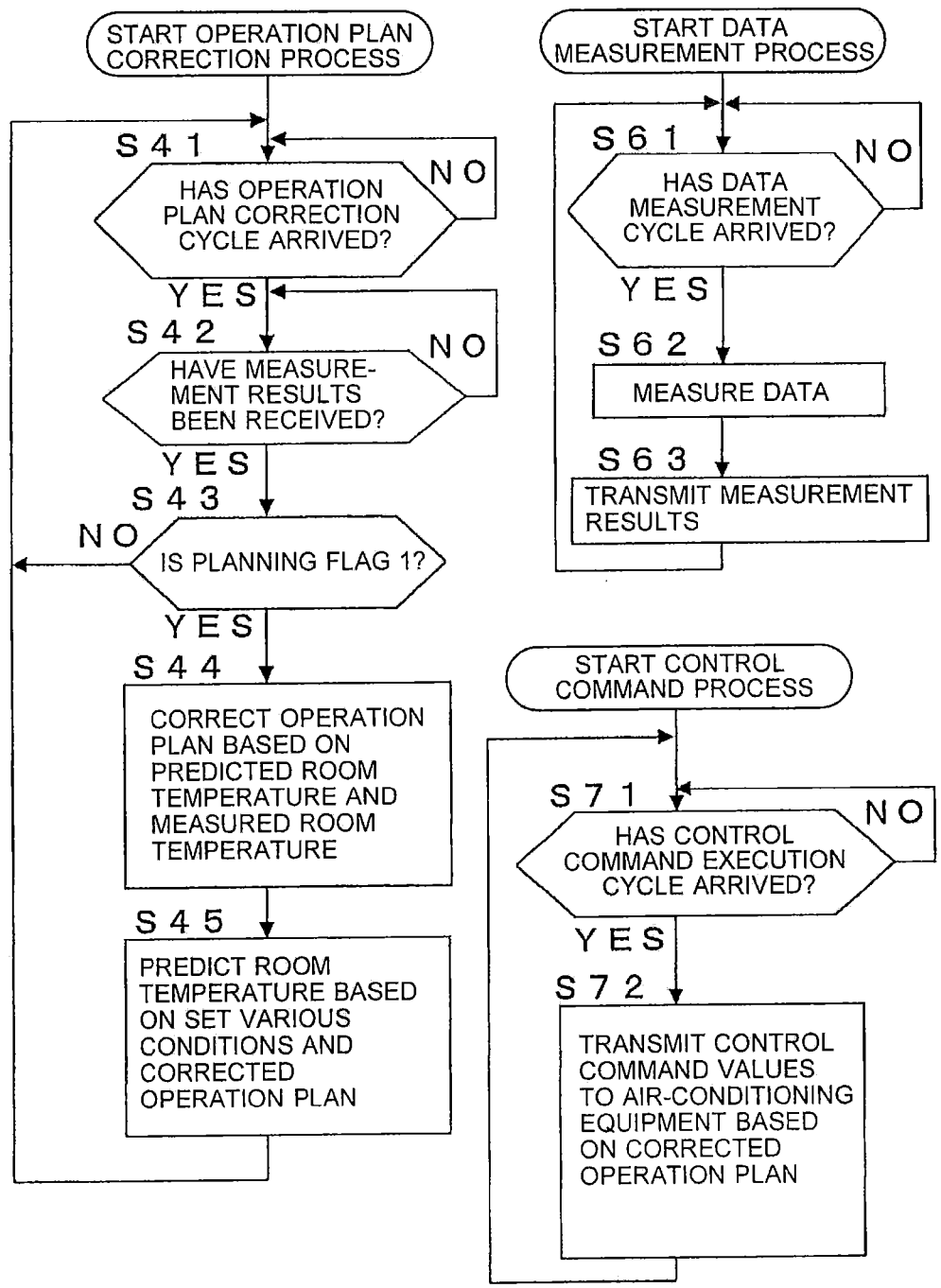
FIG. 7B is a flowchart illustrating a control example of the air-conditioning control system 1 in Embodiment 1 of the present invention.

With reference to FIGS. 7A and 7B, an operation example assuming the above-described functional configuration will be described. FIGS. 7A and 7B are flowcharts illustrating a control example of the air-conditioning control system 1 in Embodiment 1 of the present invention. As illustrated in FIG. 7A, an operation plan preparation process is an operation mainly including a condition setting process, a heat load prediction process, and an operation plan creation process and executed prior to the execution of the control of the air-conditioning equipment 12. For example, the operation plan preparation process is executed once the day before the execution of the control of the air-conditioning equipment 12. That is, the operation plan creation cycle is one day in this case. In other words, the operation plan preparation process is executed in the operation plan creation cycle, that is, once the day before the control.

Further, as illustrated in FIG. 7B, an operation plan correction process is executed after the operation plan preparation process in the operation plan correction cycle, such as a 30-minute cycle on the day of the control, for example. A data measurement process is executed in the data measurement cycle, such as a 5-minute cycle on the day of the control, for example. A control command process is executed in the control command execution cycle, such as a 5-minute cycle on the day of the control, for example. That is, the operation plan preparation process, the operation plan correction process, the data measurement process, and the control command process are executed in parallel in respective preset cycles. The processes may not be executed in parallel. For example, the operation plan preparation process, the data measurement process, the operation plan correction process, and the control command process may be sequentially executed in this order.

(Operation Plan Preparation Process)
(Step S11)
The air-conditioning control system 1 determines whether or not the operation plan creation cycle has arrived. If the operation plan creation cycle has not arrived, the air-conditioning control system 1 returns to step S11. Meanwhile, if the operation plan creation cycle has arrived, the air-conditioning control system 1 proceeds to step S12.

(Step S12)
The air-conditioning control system 1 sets a planning flag to 0.

(Condition Setting Process)
(Step S13)
The air-conditioning control system 1 sets various conditions. Specifically, the air-conditioning control system 1 sets various conditions necessary for the heat load prediction process at step S14 and the operation plan creation process at step S15 to step S17. Such various conditions include the predicted value of the outside air temperature, the predicted value of the solar radiation amount, the predicted value of the internal heat generation amount, and the set temperature, for example. The method of setting the respective predicted values is not particularly limited. For example, the predicted value of the outside air temperature and the predicted value of the solar radiation amount may be set based on meteorological data available via the Internet. As to the predicted value of the internal heat generation amount, a previously prepared standard internal heat generation amount pattern for weekdays and holidays may be set. The various conditions that are necessary usually vary between the heat load prediction process and the operation plan creation process.

(Heat Load Prediction Process)
(Step S14)

The air-conditioning control system 1 predicts the heat load based on the set various conditions. Specifically, in accordance with the various conditions set by the condition setting process, the air-conditioning control system 1 predicts the heat load at predetermined time intervals in a future period that comes after the times of execution of the condition setting process, the heat load prediction process, and the operation plan creation process, such as the plan application period, for example. More specifically, the air-conditioning control system 1 outputs a 5-minute interval air-conditioning apparatus heat supply amount required to satisfy the set temperature, with the plan application period set to 0 o'clock to 24 o'clock on the next day and inputs of the predicted value of the outside air temperature, the predicted value of the solar radiation amount, the predicted value of the internal heat generation amount, and the set temperature set by the condition setting process. The air-conditioning apparatus heat supply amount described here is a heat supply amount when the actual operation of the air-conditioning apparatus is heating, and a heat removal amount when the actual operation of the air-conditioning apparatus is cooling. However, the heat removal amount may be considered as a negative heat supply amount, and thus will be collectively described as the heat supply amount. Further, the air-conditioning apparatus heat supply amount with the inversed sign represents the heat load.

(Operation Plan Creation Process)
(Step S15)

The air-conditioning control system 1 creates the operation plan based on the predicted heat load, the restrictive condition, and the evaluation index. The operation plan corresponds to, for example, command values of the 5-minute interval compressor frequency, the performance save rate, or the like for the outdoor unit 12a. Since the air-conditioning equipment 12 normally includes a plurality of apparatuses of a plurality of types, an operation plan for minimizing the evaluation index such as the power consumption amount while satisfying the restrictive condition is created from various operation patterns of the respective apparatuses. Depending on the evaluation index, such as the comfort, for example, an operation plan for maximizing the evaluation index is created.

(Step S16)

The air-conditioning control system 1 predicts the room temperature based on the set various conditions and the created operation plan. Specifically, the air-conditioning control system 1 predicts the temperature in the room at preset time intervals in the plan application period. More specifically, the air-conditioning control system 1 outputs a 5-minute interval predicted value of the temperature in the room, with the plan application period set to 0 o'clock to 24 o'clock on the next day and inputs of the predicted value of the outside air temperature, the predicted value of the solar radiation amount, and the predicted value of the internal heat generation amount set by the condition setting process and the operation plan of the air-conditioning equipment 12.

(Step S17)

The air-conditioning control system 1 sets the planning flag to 1, and returns to step S11. It is assumed that the created operation plan is output to the operation plan correction unit 34 if the planning flag is set to 1.

(Operation Plan Correction Process)
(Step S41)

The air-conditioning control system 1 determines whether or not the operation plan correction cycle has arrived. If the operation plan correction cycle has arrived, the air-conditioning control system 1 proceeds to step S42. Meanwhile, if the operation plan creation cycle has not arrived, the air-conditioning control system 1 returns to step S41.

(Step S42)

The air-conditioning control system 1 determines whether or not the measurement results have been received. If the measurement results have been received, the air-conditioning control system 1 proceeds to step S43. Meanwhile, if the measurement results have not been received, the air-conditioning control system 1 returns to step S42. If the data measurement process and the operation plan correction process are executed in parallel, the air-conditioning control system 1 determines at step S42 that the measurement results have been received, and proceeds to step S43. In this case, the air-conditioning control system 1 performs the correction at step S43 and thereafter by using the immediately previously received measurement results.

(Step S43)

The air-conditioning control system 1 determines whether or not the planning flag is 1. If the planning flag is 1, the air-conditioning control system 1 proceeds to step S44. Meanwhile, if the planning flag is not 1, the air-conditioning control system 1 returns to step S41. This planning flag, however, is for the day of execution of the control, and is different from the planning flag for the next day, which is set at 21:00 the previous day during the creation of the operation plan.

(Step S44)

Based on the room temperature predicted by the operation plan creation process and the measured room temperature, the air-conditioning control system 1 corrects the operation plan to minimize the evaluation index within the preset target setting range while satisfying the restrictive condition.

(Step S45)

The air-conditioning control system 1 predicts the room temperature based on the set various conditions and the corrected operation plan. The air-conditioning control system 1 then returns to step S41.

(Data Measurement Process)
(Step S61)

The air-conditioning control system 1 determines whether or not the data measurement cycle has arrived. If the data measurement cycle has arrived, the air-conditioning control system 1 proceeds to step S62. Meanwhile, if the data measurement cycle has not arrived, the air-conditioning control system 1 returns to step S61.

(Step S62)

The air-conditioning control system 1 measures data.

(Step S63)

The air-conditioning control system 1 transmits the measurement results, and returns to step S61.

(Control Command Process)
(Step S71)

The air-conditioning control system 1 determines whether or not the control command execution cycle has arrived. If the control command execution cycle has arrived, the air-conditioning control system 1 proceeds to step S72. Meanwhile, if the control command execution cycle has not arrived, the air-conditioning control system 1 returns to step S71.

(Step S72)

The air-conditioning control system 1 transmits the control command values to the air-conditioning equipment 12 based on the corrected operation plan, and returns to step S71.

The various flags and the settings of the flags described above are only illustrative, and the flags and the settings thereof are not particularly limited thereto.

Figure 8:
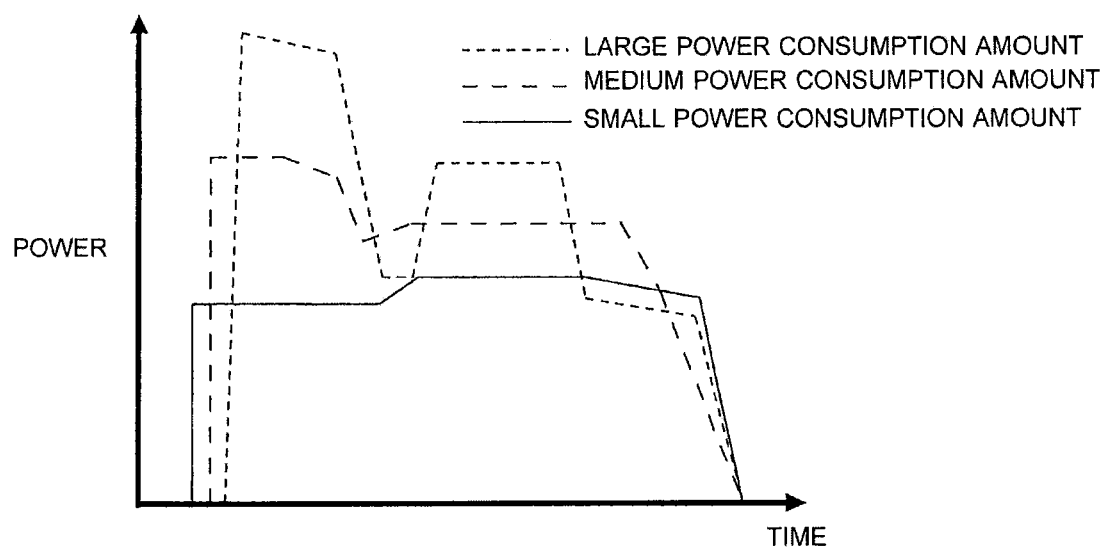
FIG. 8 is a diagram illustrating an example of Embodiment 1 of the present invention, in which operation plans are tried with a power consumption amount included in an evaluation index.

FIG. 8 is a diagram illustrating an example of Embodiment 1 of the present invention, in which operation plans are tried with the power consumption amount included in the evaluation index. FIG. 8 illustrates an example in which the power consumption amount is adopted as the evaluation index, and various operation plans are tried to address the problem of minimizing the power consumption amount. For example, in FIG. 8, the horizontal axis represents the time, and the vertical axis represents the power.

Further, the area enclosed by a dotted line indicates a case in which the power consumption amount is large. The area enclosed by a broken line indicates a case in which the power consumption amount is medium. The area enclosed by a solid line indicates a case in which the power consumption amount is small. As illustrated in FIG. 8, a process is presented in which the above-described series of processes are executed to set the power consumption amount to a small value.

(Effects)

With the operation plan corrected by the above-described exemplary operation, it is possible to execute the control of the air-conditioning equipment 12 for maximizing or minimizing the evaluation index in accordance with the change in the state during the execution of the control, while following the operation plan of the air-conditioning equipment 12 for maximizing or minimizing the evaluation index created at the time of creation of the operation plan. Accordingly, it is possible to achieve energy saving while maintaining the comfort.

As described above, in Embodiment 1, the air-conditioning control system 1, which controls the air-conditioning equipment 12 installed in a building, includes the heat load prediction unit 32 that predicts the change over time of the heat amount to be processed by the air-conditioning equipment 12 based on the provided heat load prediction data, the operation plan creation unit 33 that previously creates the operation plan of the air-conditioning equipment 12 in the air-conditioning operation plan application period to reduce one of the power consumption amount and the running cost of the air-conditioning equipment 12 serving as the evaluation index under a first restrictive condition that a total process heat load be maintained at the same level or within the range of a predetermined amount of difference and that the temperature in the room be maintained within the predetermined comfortable temperature range, the operation plan correction unit 34 that corrects the operation plan in the predetermined cycle during the execution of the control of the air-conditioning equipment 12 in accordance with the operation plan, and the temperature sensor that measures the temperature in the room. The operation plan creation unit 33 and the operation plan correction unit 34 include the temperature prediction block 43 and the temperature prediction block 47 respectively, that predicts the changeover time of the temperature in the room based on the provided temperature prediction data. The air-conditioning control system 1 is configured such that, if the actually measured temperature measured by the temperature sensor is different from the predicted temperature predicted by the operation plan creation unit 33 at the time of creation of the operation plan, the operation plan correction unit 34 predicts the change over time of the temperature in the room in the correction application period in the plan application period, in which the correction is performed, and corrects the operation plan to minimize the evaluation index under the first restrictive condition, with a second restrictive condition set as that the error between the predicted temperature predicted by the operation plan correction unit 34 and the predicted. temperature predicted by the operation plan creation unit 33 be maintained within the predetermined allowable fluctuation range at one time or a plurality of times in the correction application period.

The above-described configuration allows the previously created operation plan to be properly corrected in accordance with the state during the execution, and thus exhibits an unconventional noticeable effect of allowing improvement of energy saving performance while maintaining the temperature, humidity, or the like in the room at a comfortable level.

Embodiment 2

Variations of Evaluation Index and Restrictive Condition

Figure 9:
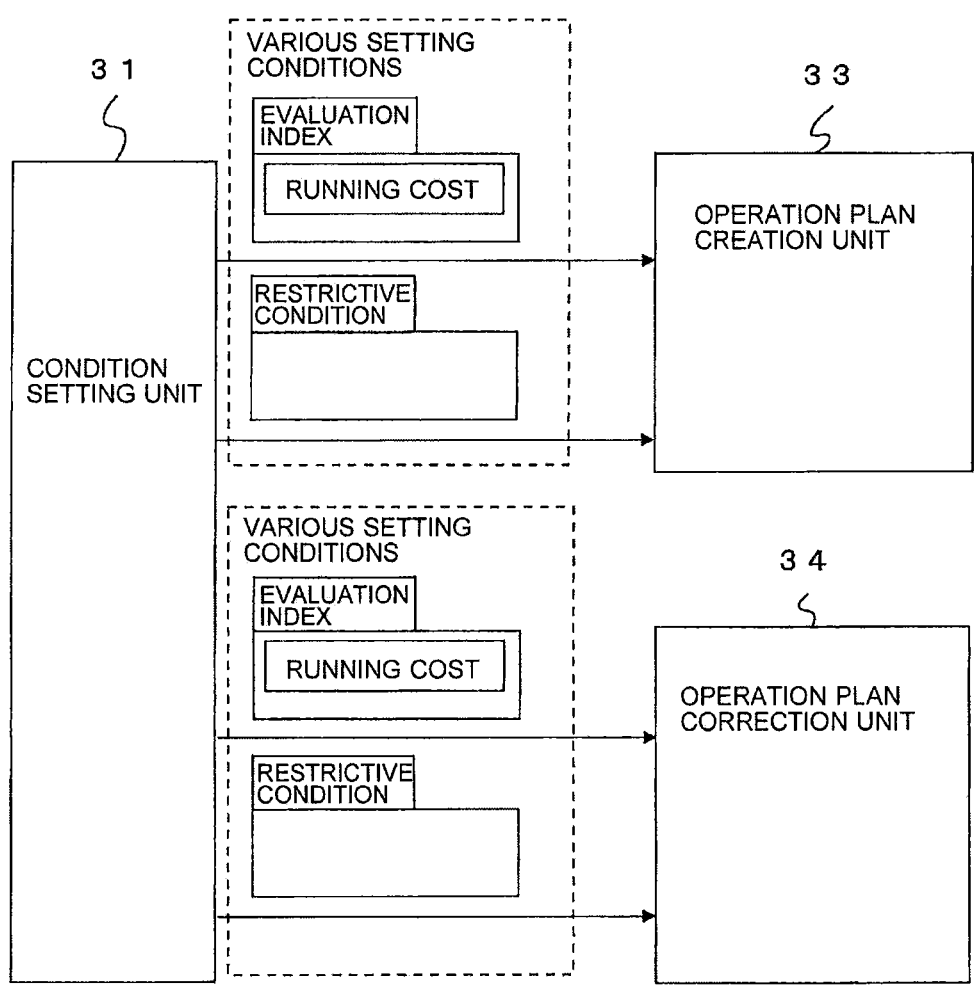
FIG. 9 is a diagram illustrating an example of Embodiment 2 of the present invention, in which a running cost is included in the evaluation index.

Differences from Embodiment 1 lie in the evaluation index and the restrictive condition. Although the power consumption amount is adopted as the evaluation index in the operation plan creation unit 33 and the operation plan correction unit 34 in Embodiment 1, the running cost may be adopted. FIG. 9 is a diagram illustrating an example of Embodiment 2 of the present invention, in which the running cost is included in the evaluation index. As illustrated in FIG. 9, the running cost set by the condition setting unit 31 is supplied to each of the operation plan creation unit 33 and the operation plan correction unit 34 as the evaluation index. In this case, the power rate by time slot or the like may be set as necessary by the condition setting unit 31.

Further, to take the comfort also into consideration in the evaluation index, an evaluation index J expressed by formula (4) may be set in which the power consumption amount and the running cost are combined with the degree of deviation of the room temperature from the set temperature and the time rate of change of the room temperature.

[Math. 2]

$$J = \alpha_1 \times J_1 + \alpha_2 \times J_2 + \alpha_3 \times J_3 + \alpha_4 \times J_4 \quad (4)$$

Herein, J1 represents the power consumption amount of the air-conditioning equipment 12 over the entire plan application period, J2 represents the running cost of the air-conditioning equipment 12 over the entire plan application period, J3 represents the root-mean-square value of the degree of deviation of the room temperature from the set temperature, J4 represents the root-mean-square value of the time rate of change of the room temperature, and $\alpha_1$ to $\alpha_4$ represent respective weight coefficients. As to J3 and J4, however, it is unnecessary to incorporate the root-mean-square value into the evaluation index. As to J3, for example, the maximum value of the absolute value of the degree of deviation may also be taken into consideration in the evaluation index. Further, as to J4, the maximum value of the absolute value of the time rate of change may also be taken into consideration in the evaluation index.

Figure 10:
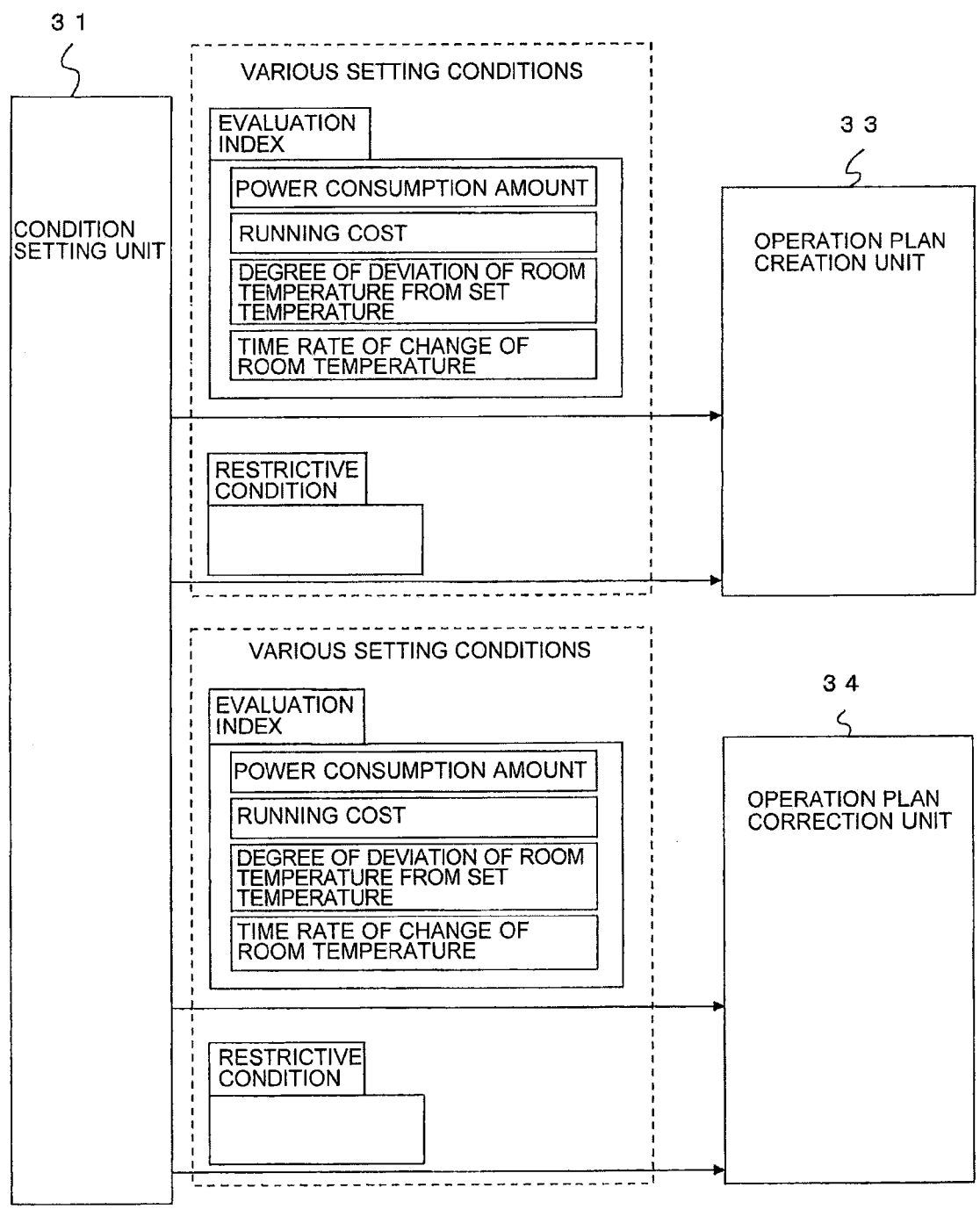
FIG. 10 is a diagram illustrating an example of Embodiment 2 of the present invention, in which the power consumption amount, the running cost, a degree of deviation of the room temperature from a set temperature, and a time rate of change of the room temperature are included in the evaluation index.

FIG. 10 is a diagram illustrating an example of Embodiment 2 of the present invention, in which the power consumption amount, the running cost, the degree of deviation of the room temperature from the set temperature, and the time rate of change of the room temperature are included in the evaluation index. As illustrated in FIG. 10, the power consumption amount, the running cost, the degree of deviation of the room temperature from the set temperature, and the time rate of change of the room temperature set by the condition setting unit 31 are supplied to each of the operation plan creation unit 33 and the operation plan correction unit 34 as the evaluation index. The operation plan correction unit 34 may perform an operation in which the above-described plan application period is replaced by the correction application period.

(Effects)

With the above-described configuration, the evaluation index does not simply aim to minimize the power consumption amount and the running cost but takes the comfort also into consideration. It is therefore possible to create and correct the operation plan of the air-conditioning equipment 12 in consideration of the balance between the energy saving performance and the comfort.

(Variations of Restrictive Condition)

Figure 11:
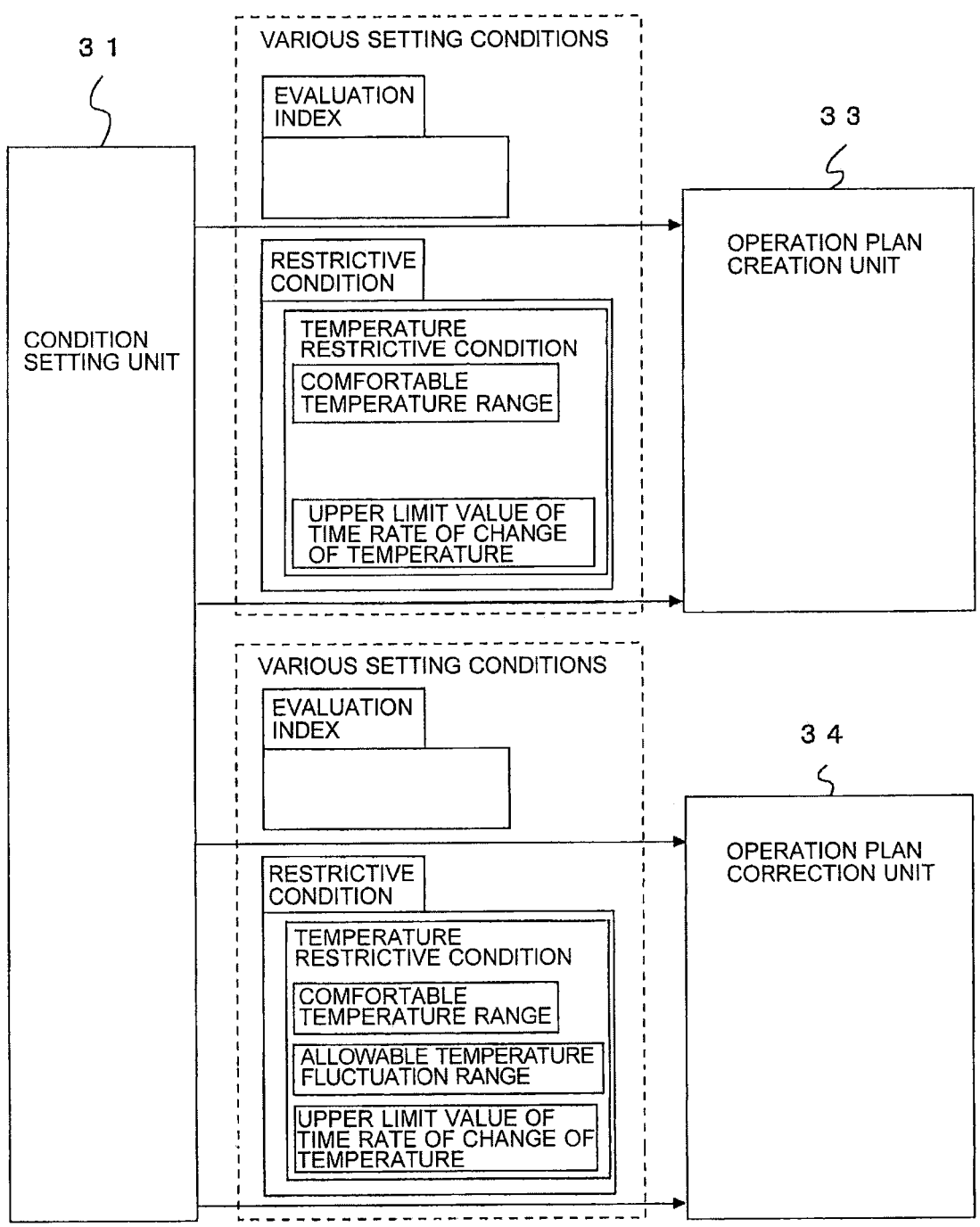
FIG. 11 is a diagram illustrating an example of Embodiment 2 of the present invention, in which a condition related to the temperature is included in a restrictive condition.

Further, in Embodiment 1, maintaining the temperature within the preset comfortable temperature range is set as the restrictive condition related to the temperature. In addition thereto, maintaining the time rate of change of the temperature within a preset temperate change rate may be added to the restrictive condition. That is, keeping the time rate of change of the temperature from exceeding the upper limit value of the time rate of change of the temperature may be set as the restrictive condition. FIG. 11 is a diagram illustrating an example of Embodiment 2 of the present invention, in which the condition related to the temperature is included in the restrictive condition. As illustrated in FIG. 11, the upper limit value of the time rate of change of the temperature is added as a new temperature restrictive condition.

For example, a restriction of 0.2 [degrees Celsius/5 minutes or less] is imposed on the time rate of change of the temperature. With such a restriction, control of the air-conditioning equipment 12 involving a sharp change in temperature is avoidable, and the comfort is further improved.

(Effects)

The above-described configuration allows the creation and correction of the operation plan of the air-conditioning equipment 12 in consideration of the comfort from various perspectives.

(Allowing Deviation from Restrictive Condition)

Figure 12:
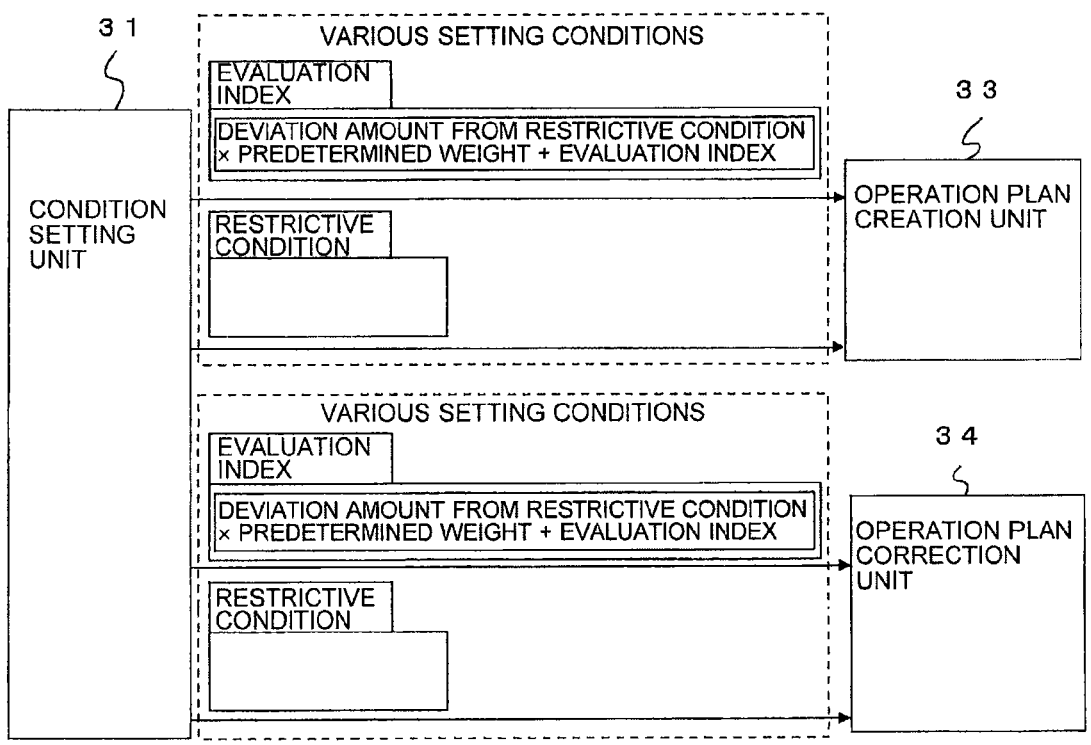
FIG. 12 is a diagram illustrating an example of Embodiment 2 of the present invention, in which a deviation amount from the restrictive condition is included in the evaluation index.

Further, in Embodiment 1, the operation pattern minimizing the power consumption amount is determined as the operation plan out of the operation patterns of the air-conditioning equipment 12 satisfying the restrictive condition. If the evaluation index is redefined as the sum of the original evaluation index and the deviation amount from the restrictive condition multiplied by a predetermined weight, an operation plan of the air-conditioning equipment 12 is allowed which is capable of enhancing the energy saving performance even if there is slight deviation from the restrictive condition. FIG. 12 is a diagram illustrating an example of Embodiment 2 of the present invention, in which the deviation amount from the restrictive condition is included in the evaluation index. As illustrated in FIG. 12, the deviation amount from the restrictive condition is multiplied by a predetermined weight, and the evaluation index is redefined as the result of addition of the multiplication result and the evaluation index and supplied to each of the operation plan creation unit 33 and the operation plan correction unit 34 from the condition setting unit 31.

(Effects)

The above-described configuration allows the creation and correction of the operation plan of the air-conditioning equipment 12 capable of enhancing the energy saving performance even if there is slight deviation from the restrictive condition.

Embodiment 3

Demand Response

Figure 13:
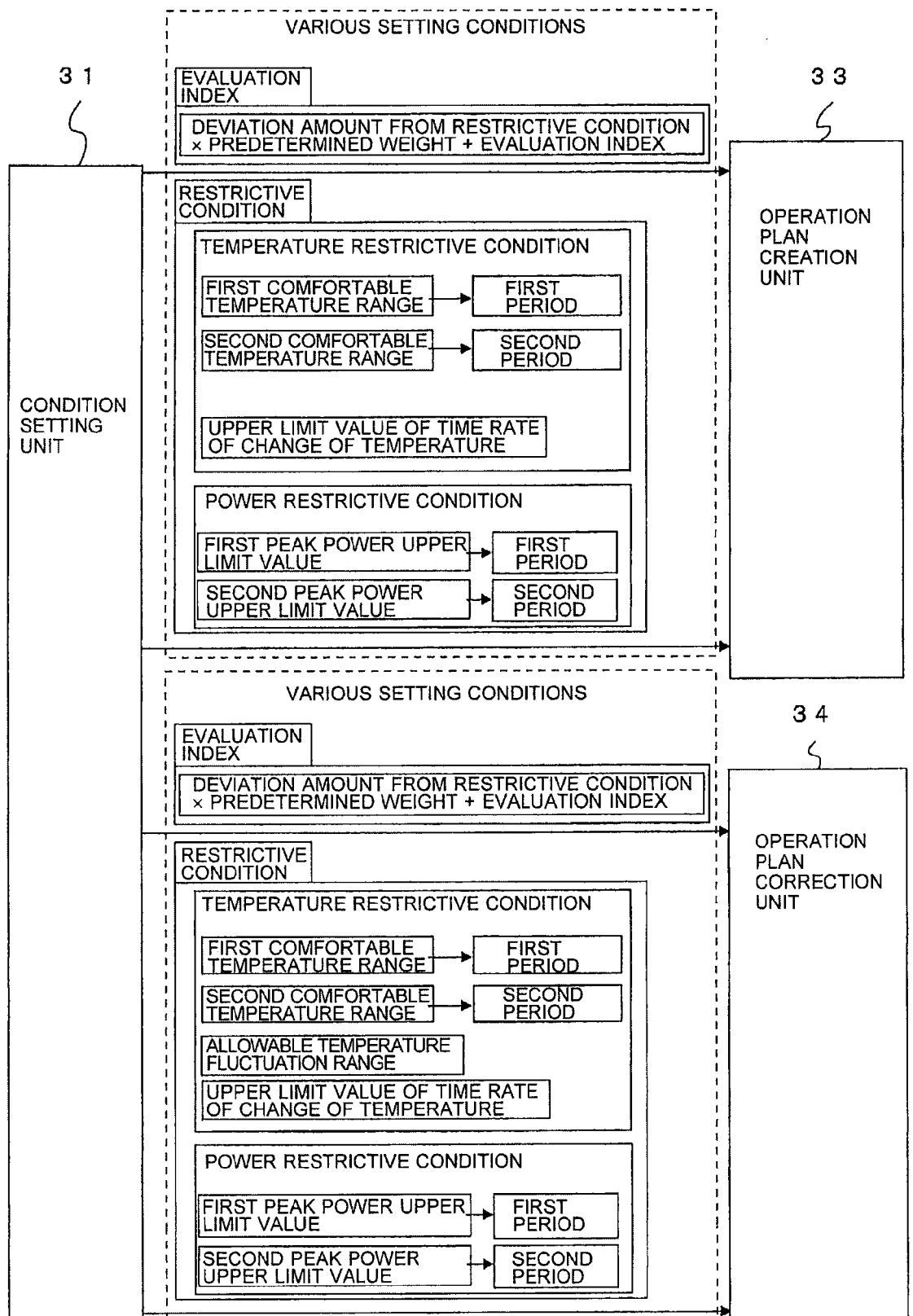
FIG. 13 is a diagram illustrating an example of the various setting conditions in Embodiment 3 of the present invention.

It is conceivable that a reduction of peak power, that is, a peak cut, may be necessary the next day in a certain time slot, such as a first time period, for example. It is also conceivable that the need for the peak cut in the first period is previously known. For convenience of description, the target value of the peak power corresponding to the first period may be referred to as the first target power. FIG. 13 is a diagram illustrating an example of the various setting conditions in Embodiment 3 of the present invention. As illustrated in FIG. 13, a first comfortable temperature range corresponding to the first period and a second comfortable temperature range corresponding to a second period are set in the temperature restrictive condition. Further, a first peak power upper limit value corresponding to the first period and a second peak power upper limit value corresponding to the second period are set in a power restrictive condition.

FIG. 14 is a diagram illustrating an example of the operation plan in Embodiment 3 of the present invention assuming the reduction of the peak power. FIG. 14 is an example assuming the need for peak cut with a condition that the first period is from 13:00 to 16:00 and the first target power is 100 kW. A description will be given below with this condition taken as an example.

The condition setting unit 31 sets the peak cut as one of the restrictive conditions. That is, the condition setting unit 31 sets the peak power during 13:00 to 16:00 to 100 kW. However, the first period corresponding to the time slot for the peak cut and the maximum power may be arbitrarily set.

The operation plan creation unit 33 creates the operation plan of the air-conditioning equipment 12 under the above-described restrictive condition. In this case, the operation plan creation unit 33 attempts to create the plan to maintain the temperature in the room within the comfortable temperature range, as described in Embodiment 1. Since the restrictive condition of the peak cut is set, however, a case is conceivable in which there is no operation pattern satisfying the restrictive condition. Such a situation may be addressed by applying a restrictive condition allowing deviation therefrom out of the various restrictive conditions described in Embodiment 2 to allocate an operation pattern. Simply allowing such an operation pattern, however, may cause large deviation of the temperature in the room from the comfortable temperature range during the first period.

Therefore, the comfortable temperature range corresponding to the second period, which is in the past from the first period, that is, precedes the first period, is set to be different from the comfortable temperature range corresponding to the first period. For example, in summer, the comfortable temperature range corresponding to the first period is set to 26 to 28 [degrees Celsius], and the comfortable temperature range corresponding to the second period is set to 25 to 27 [degrees Celsius]. With such settings, it is possible to maintain the comfort in the first period by executing precooling for the first period as preprocessing of the peak cut. With the change in the comfortable temperature range corresponding to the second period, the temperature in the first period is expected to deviate from the comfortable temperature range corresponding to the first period.

For example, there is such a possibility around 13:00 to 13:40 in FIG. 14. Such deviation, however, may be considered as deviation toward higher comfort. This is because, in summer, for example, the room temperature is controlled at a relatively low level. Accordingly, the increase in the evaluation index related to the deviation amount of the restrictive condition to the evaluation index may be set to 0.

The length and the comfortable temperature range of the second period may be manually set by the manager of the building, or may be automatically determined by the operation plan creation unit 33.

Figure 15:
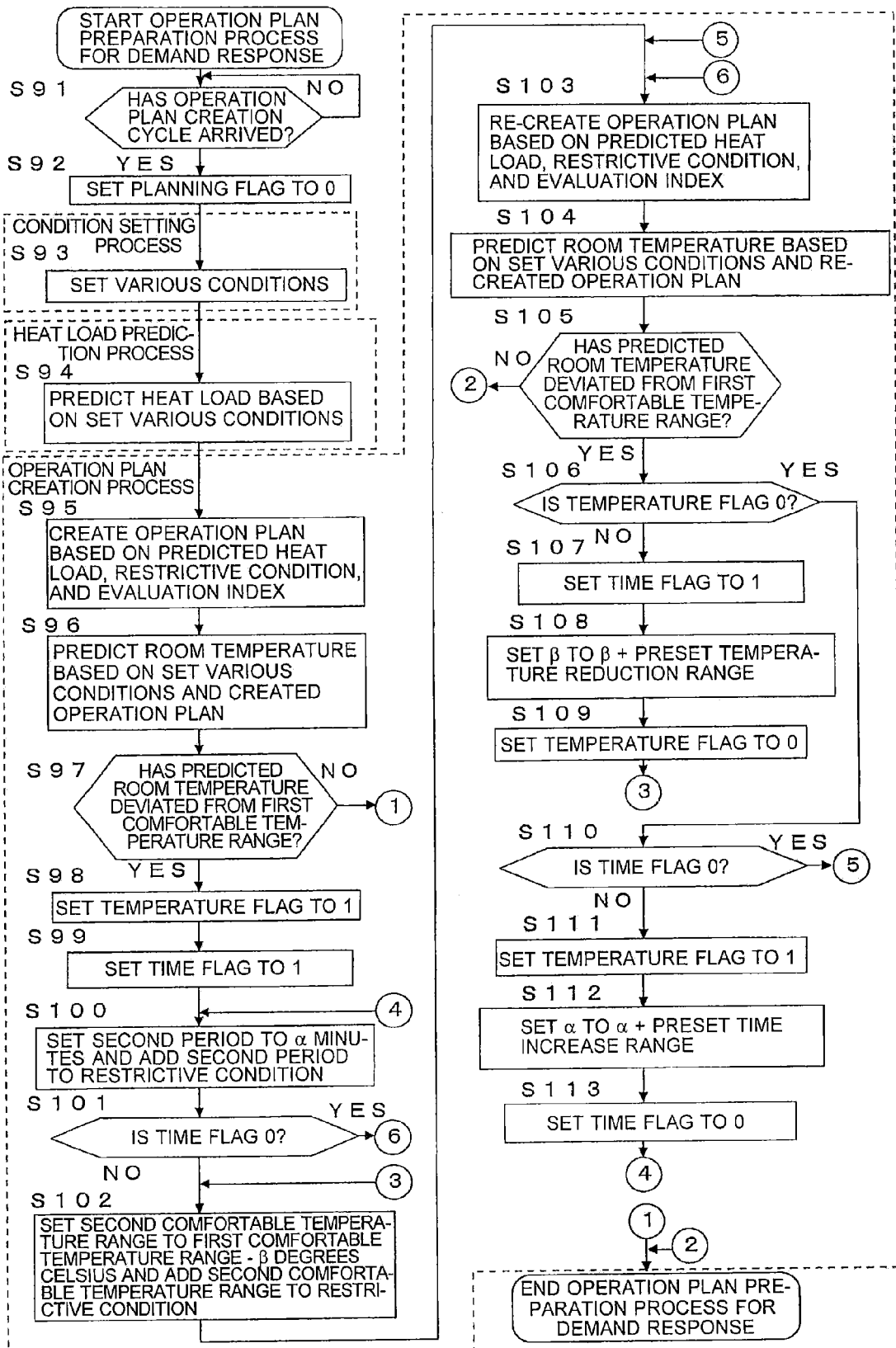
FIG. 15 is a flowchart illustrating a control example of the air-conditioning control system 1 for determining a comfortable temperature range in a part of the operation plan in Embodiment 3 of the present invention assuming the reduction of the peak power and the period of the comfortable temperature range in the part.

FIG. 15 is a flowchart illustrating a control example of the air-conditioning control system 1 for determining a comfortable temperature range in a part of the operation plan in Embodiment 3 of the present invention assuming the reduction of the peak power and the period of the comfortable temperature range in the part. Herein, the operation plan is created on the assumption that the second period is not initially set.

(Step S91)

The air-conditioning control system 1 determines whether or not the operation plan creation cycle has arrived. If the operation plan creation cycle has arrived, the air-conditioning control system 1 proceeds to step S92. Meanwhile, if the operation plan creation cycle has not arrived, the air-conditioning control system 1 returns to step S91.

(Step S92)

The air-conditioning control system 1 sets the planning flag to 0.

(Condition Setting Process)
(Step S93)

The air-conditioning control system 1 sets the various conditions.

(Heat Load Prediction Process)
(Step S94)

The air-conditioning control system 1 predicts the heat load based on the set various conditions.

(Operation Plan Creation Process)
(Step S95)

The air-conditioning control system 1 creates the operation plan based on the predicted heat load, the restrictive condition, and the evaluation index.

(Step S96)

The air-conditioning control system 1 predicts the room temperature based on the set various conditions and the created operation plan.

(Step S97) The air-conditioning control system 1 determines whether or not the predicted room temperature has deviated from the first comfortable temperature range. If the predicted room temperature has deviated from the first comfortable temperature range, the air-conditioning control system 1 proceeds to step S98. Meanwhile, if the predicted room temperature has not deviated from the first comfortable temperature range, the air-conditioning control system 1 completes the process.

(Step S98)

The air-conditioning control system 1 sets a temperature flag to 1.

(Step S99)

The air-conditioning control system 1 sets a time flag to 1.

(Step S100)

The air-conditioning control system 1 sets the second period to a minutes and adds the second period to the restrictive condition. For example, a minutes is 30 minutes.

(Step S101)

The air-conditioning control system 1 determines whether or not the time flag is 0. If the time flag is 0, the air-conditioning control system 1 proceeds to step S103. Meanwhile, if the time flag is not 0, the air-conditioning control system 1 proceeds to step S102.

(Step S102)

The air-conditioning control system 1 sets the second comfortable temperature range to the first comfortable temperature range–$\beta$ degrees Celsius and adds the second comfortable temperature range to the restrictive condition. For example, $\beta$ [degrees Celsius] is 0.5 [degrees Celsius].

(Step S103)

The air-conditioning control system 1 re-creates the operation plan based on the predicted heat load, the restrictive condition, and the evaluation index.

(Step S104)

The air-conditioning control system 1 predicts the room temperature based on the set various conditions and the re-created operation plan.

(Step S105)

The air-conditioning control system 1 determines whether or not the predicted room temperature has deviated from the first comfortable temperature range. If the predicted room temperature has deviated from the first comfortable temperature range, the air-conditioning control system 1 proceeds to step S106. Meanwhile, if the predicted room temperature has not deviated from the first comfortable temperature range, the air-conditioning control system 1 completes the process.

(Step S106)

The air-conditioning control system 1 determines whether or not the temperature flag is 0. If the temperature flag is 0, the air-conditioning control system 1 proceeds to step S110. Meanwhile, if the temperature flag is not 0, the air-conditioning control system 1 proceeds to step S107.

(Step S107)

The air-conditioning control system 1 sets the time flag to 1.

(Step S108)

The air-conditioning control system 1 sets $\beta$ to $\beta$+ a preset temperature reduction range. For example, the newly set $\beta$ is the value reduced from the temperature range corresponding to the first period by 1 [degree Celsius]. That is, this case is an example in which the preset temperature reduction range is set to 0.5 [degrees Celsius], as compared with the process of step S102.

(Step S109)

The air-conditioning control system 1 sets the temperature flag to 0, and returns to step S102.

(Step S110)

The air-conditioning control system 1 determines whether or not the time flag is 0. If the time flag is 0, the air-conditioning control system 1 returns to step S103. Meanwhile, if the time flag is not 0, the air-conditioning control system 1 proceeds to step S111.

(Step S111)

The air-conditioning control system 1 sets the temperature flag to 1.

(Step S112)

The air-conditioning control system 1 sets α to α+ a preset time increase range, and proceeds to step S113. The newly set α is 1 hour, for example. That is, this case is an example in which the preset time increase range is set to 30 minutes, as compared with the process of step S100.

(Step S113)

The air-conditioning control system 1 sets the time flag to 0, and returns to step S100.

The above-described examples of the various flags and the settings thereof are illustrative, and the flags and settings are not particularly limited thereto.

With the above-described operation, the second period is extended in stages, and the comfortable temperature range is reduced in stages. However, the maximum length of the second period and the maximum degree of the difference of the comfortable temperature range from that of the first period are set by the condition setting unit 31. Further, 30 minutes, 1 hour, 0.5 [degrees Celsius], and 1 [degree Celsius] described above are only illustrative, and the values are not particularly limited thereto.

The operation plan correction unit 34 may correct the operation plan created as described above by the method described in Embodiment 1 or Embodiment 2. Since the correction is performed such that the predicted temperature at the time of planning is followed at one time or a plurality of times in the correction application period, as described in Embodiment 1, it is possible to reliably execute the precooling before the peak cut, which is executed in the second period.

Further, although the foregoing description has been given of an example in which the comfortable temperature range corresponding to the second period is changed, the operation plan correction unit 34 may change the set temperature corresponding to the second period. Further, although the upper limit value of the power is not provided in a period other than the first period, the operation plan may be created and corrected with target power corresponding to a period other than the first period, such as second target power, for example, provided in the period other than the first period in order to prevent an excessive increase in power consumption. Further, although the description has been given of an operation addressing the peak cut, an operation plan for reducing the running cost may be created and corrected by applying an operation similar to the above-described operation if it is previously known that the power rate is high in a specific time slot, for example.

Further, although the operation plan assuming the peak cut is created the previous day, the air-conditioning control is not necessarily required to be performed based on the operation plan created the previous day if the need for the peak cut is obviated on the day of the control.

Further, a plurality of cases of the peak cut may be assumed, and respective operation plans therefor may be created the previous day. Then, the most suitable operation plan may be selected and corrected in accordance with the state of the peak cut on the day of the control. For example, operation plans may be created for Case 0 in which there is no peak cut, Case 1 in which the peak cut is set to 100 kW in 13:00 to 16:00, Case 2 in which the peak cut is set to 80 kW in 13:00 to 16:00, and Case 3 in which the peak cut is set to 100 kW in 13:00 to 15:00. Then, Case 0 may be selected if the peak cut is unnecessary, and one of Case 1 to Case 3 may be selected in accordance with the status if the peak cut is necessary, to correct the operation plan based thereon.

(Effects)

With the above-described configuration, it is possible to prepare in advance for the peak cut in a specific time slot due to demand response or the like by performing precooling or preheating immediately before the peak cut. It is therefore possible to achieve the peak cut in the peak cut period, and reduce the power consumption amount over the entire period while preventing the temperature in the room from deviating from the comfortable temperature range.

Embodiment 4

Figure 16:
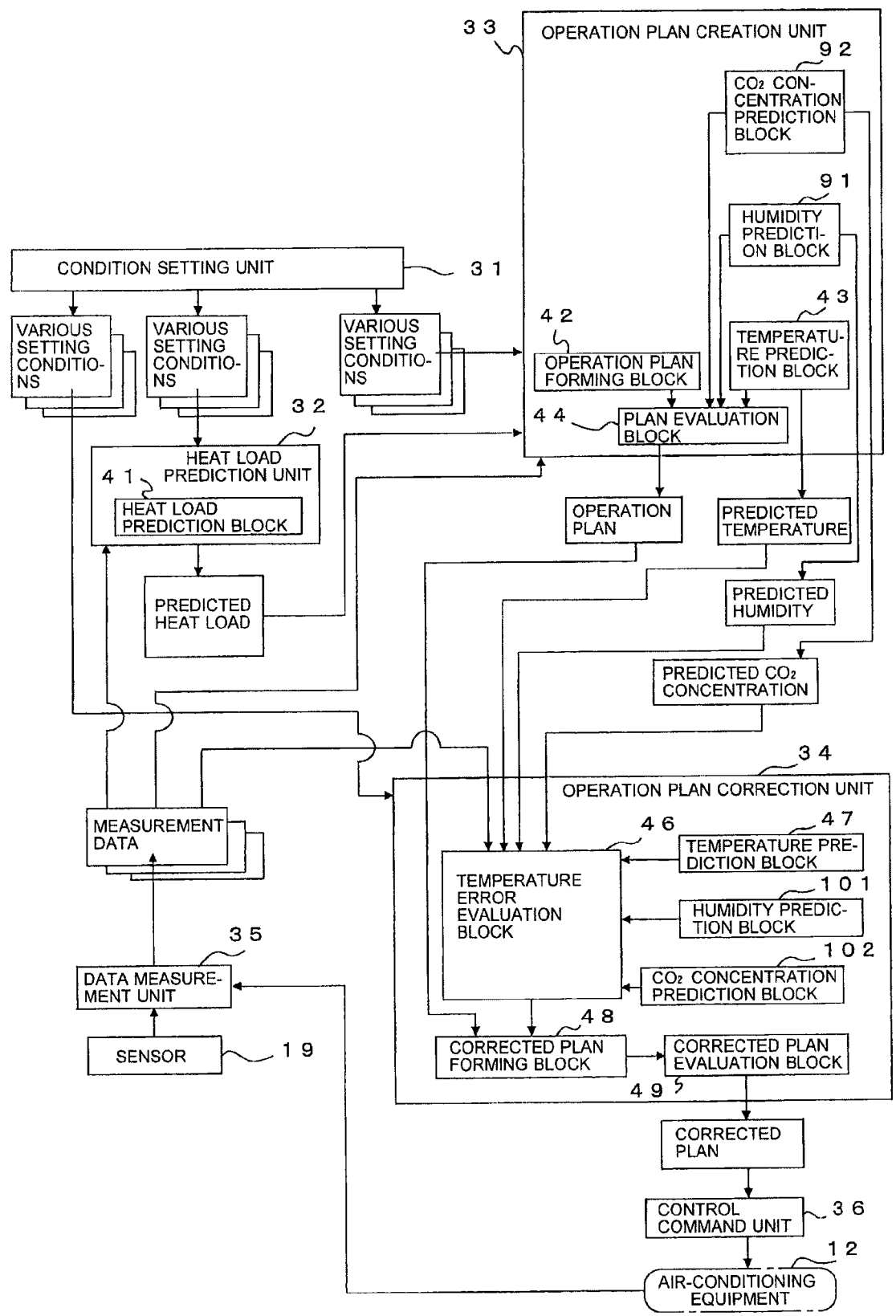
FIG. 16 is a diagram illustrating an example of the functional configuration of the air-conditioning control system 1 in Embodiment 4 of the present invention.

In Embodiment 4, in addition to the items related to the temperature, items related to at least one of the humidity and the $CO_2$ concentration are further taken into consideration as the restrictive condition and the evaluation index related to the comfort. FIG. 16 is a diagram illustrating an example of the functional configuration of the air-conditioning control system 1 in Embodiment 4 of the present invention. As illustrated in FIG. 16, in the air-conditioning control system 1, the operation plan creation unit 33 further includes at least one or more of humidity prediction block 91 and a $CO_2$ concentration prediction block 92. Further, in the air-conditioning control system 1, the operation plan correction unit 34 further includes at least one or more of humidity prediction block 101 and a $CO_2$ concentration prediction block 102.

A humidity prediction model in consideration of the outside air humidity, the generation of moisture released from human bodies, and so forth is implemented in each of the humidity prediction block 91 and the humidity prediction block 101. The humidity prediction block 91 and the humidity prediction block 101 therefore predict the change over time of the humidity in the room based on provided humidity prediction data.

A $CO_2$ concentration prediction model in consideration of the ventilation with outside air, the generation of $CO_2$ released from human bodies, and so forth is implemented in each of the $CO_2$ concentration prediction block 92 and the $CO_2$ concentration prediction block 102. The $CO_2$ concentration prediction block 92 and the $CO_2$ concentration prediction block 102 therefore predict the change over time of the $CO_2$ concentration in the room based on provided $CO_2$ concentration prediction data.

In Embodiment 4, the evaluation index J in the operation plan creation unit 33 and the operation plan correction unit 34 is expanded as in the following formula (5) to derive an evaluation index in consideration of the humidity or the $CO_2$ concentration.

[Math. 3]

$$J = \alpha_1 \times J_1 + \alpha_2 \times J_2 + \alpha_3 \times J_3 + \alpha_4 \times J_4 + \alpha_5 \times J_5 + \alpha_6 \times J_6 + \alpha_7 \times J_7 + \alpha_8 \times J_8 \quad (5)$$

Herein, J1 represents the power consumption amount of the air-conditioning equipment 12 over the entire plan application period, J2 represents the running cost of the air-conditioning equipment 12 over the entire plan application period, J3 represents the root-mean-square value of the degree of deviation of the temperature in the room from the set temperature, J4 represents the root-mean-square value of the time rate of change of the temperature in the room, J5 represents the root-mean-square value of the degree of deviation of the humidity from set humidity, J6 represents the root-mean-square value of the time rate of change of the humidity, J7 represents the root-mean-square value of the degree of deviation of the $CO_2$ concentration from a set $CO_2$ concentration, J8 represents the root-mean-square value of the time rate of change of the $CO_2$ concentration, and α1 to α8 represent respective weight coefficients thereof.

As to J3 to J8, however, it is unnecessary to incorporate the root-mean-square value into the evaluation index. As to J3, for example, the maximum value of the absolute value of the degree of deviation may also be taken into consideration in the evaluation index. As to J4, the maximum value of the absolute value of the time rate of change may also be taken into consideration in the evaluation index.

Figure 17:
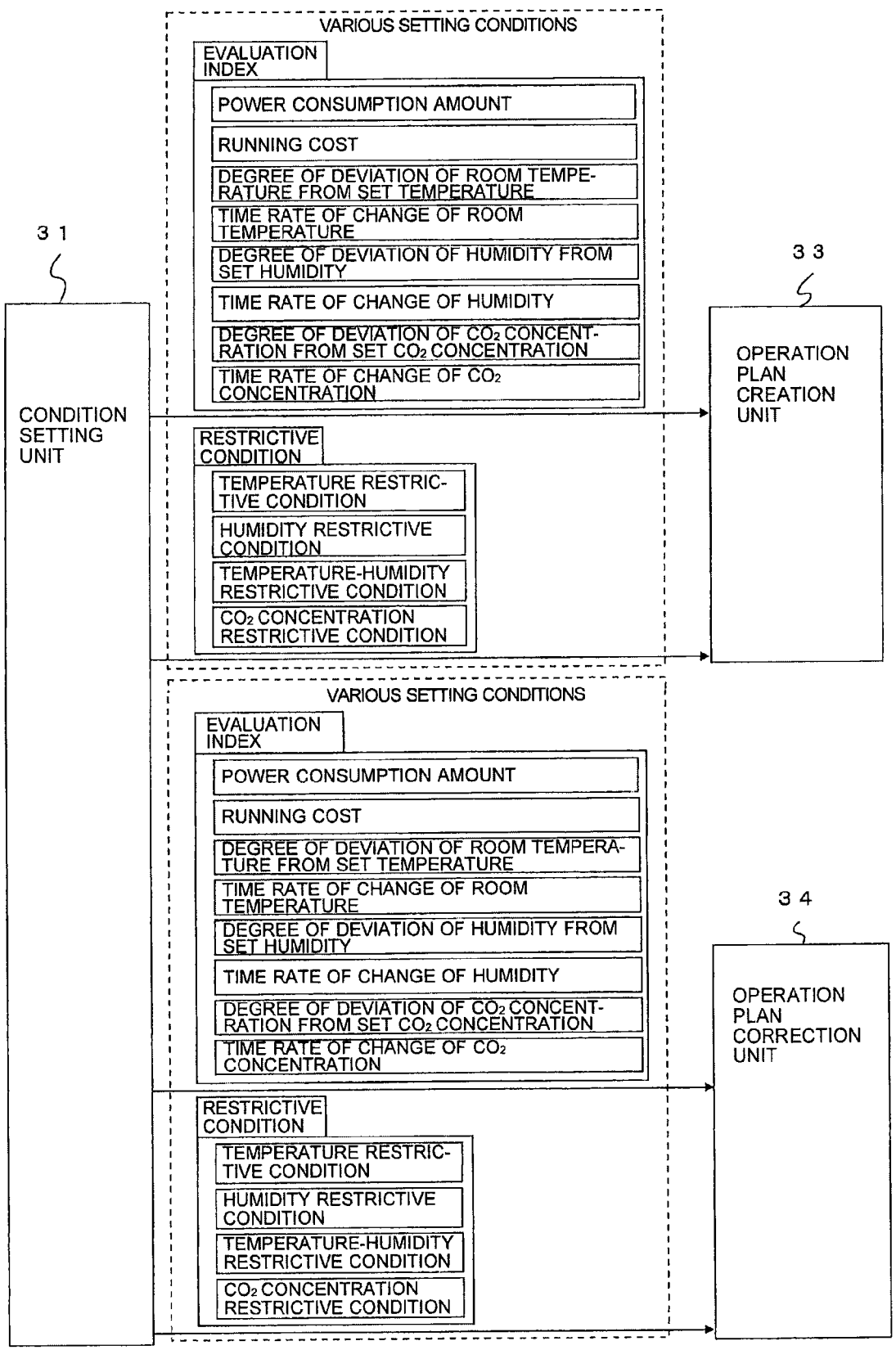
FIG. 17 is a diagram illustrating a detailed example of the evaluation index in the various setting conditions in Embodiment 4 of the present invention.

The operation plan correction unit 34 performs an operation in which the plan application period is replaced by the correction application period. FIG. 17 is a diagram illustrating a detailed example of the evaluation index in the various setting conditions in Embodiment 4 of the present invention. As illustrated in FIG. 17, evaluation indices related to the humidity and evaluation indices related to the $CO_2$ concentration are added.

Further, although only the restrictive condition related to the temperature has been described in Embodiment 1, restrictive conditions related to the humidity and the $CO_2$ concentration may be added thereto. Specifically, one of first to seventh conditions or a combination of two or more thereof is set as the restrictive condition. The first condition is that the temperature in the room in the plan application period be maintained within the preset comfortable temperature range. The second condition is that the time rate of change of the temperature in the room in the plan application period be maintained within the preset temperature change rate. The third condition is that the humidity in the room in the plan application period be maintained within a preset comfortable humidity range. The fourth condition is that the time rate of change of the humidity in the room in the plan application period be maintained within a preset humidity change rate. The fifth condition is that temperature-humidity comfort, which is determined based on both the temperature in the room and the humidity in the room, in the plan application period be maintained within a preset comfortable temperature-humidity range. The sixth condition is that the $CO_2$ concentration in the room in the plan application period be maintained within a preset comfortable $CO_2$ concentration range. The seventh condition is that the time rate of change of the $CO_2$ concentration in the room in the plan application period be maintained within a preset $CO_2$ concentration change rate.

Figure 18:
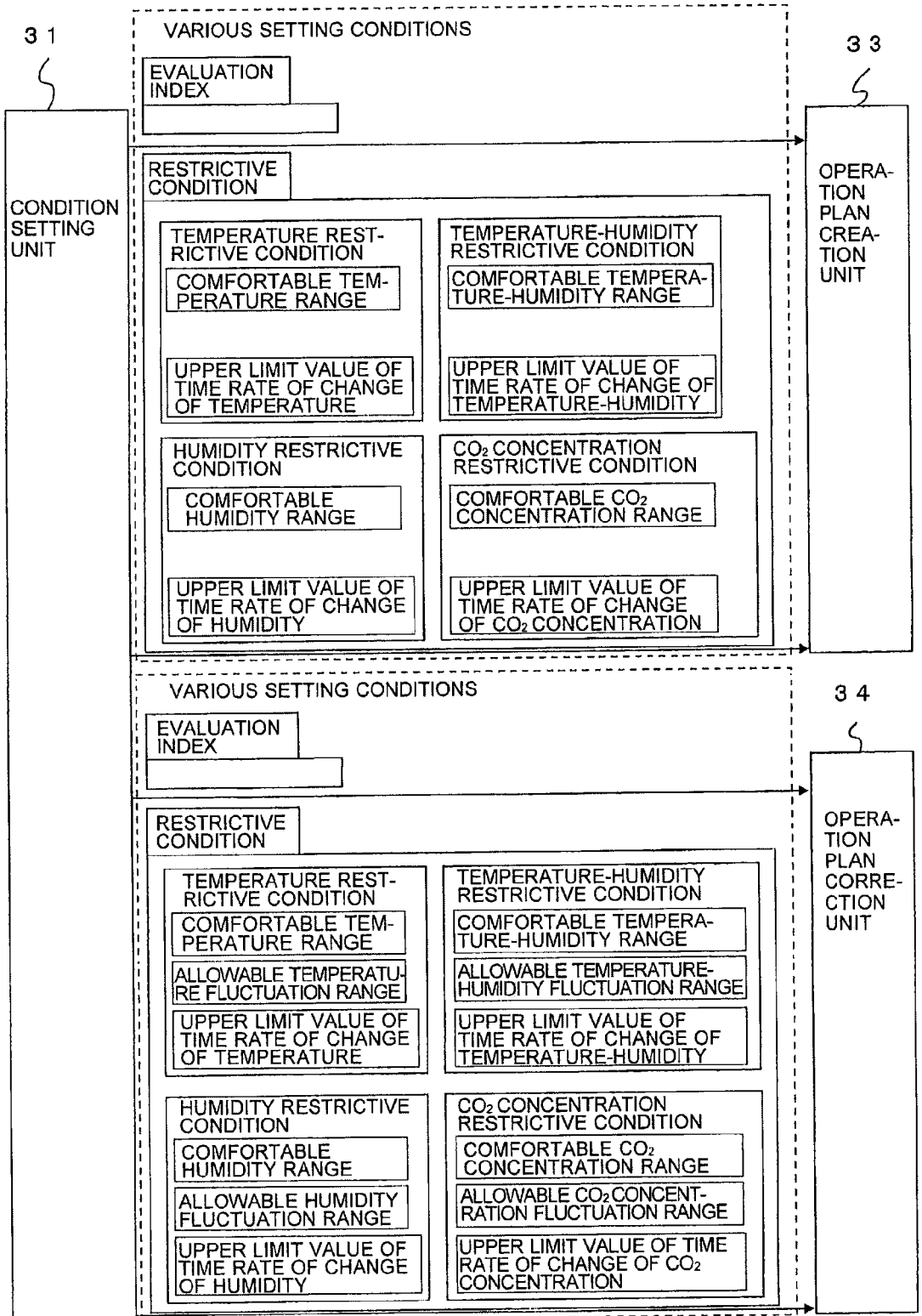
FIG. 18 is a diagram illustrating a detailed example of the restrictive condition in the various setting conditions in Embodiment 4 of the present invention.

The operation plan correction unit 34 performs an operation in which the plan application period is replaced by the correction application period. FIG. 18 is a diagram illustrating a detailed example of the restrictive condition in the various setting conditions in Embodiment 4 of the present invention. As illustrated in FIG. 18, a humidity restrictive condition, a temperature-humidity restrictive condition, and a $CO_2$ concentration restrictive condition are added as well as the temperature restrictive condition. An example of the comfortable temperature-humidity range is PMV (Predicted Mean Vote). Further, a restrictive condition satisfying the comfort specified in ASHRAE (American Society of Heating, Refrigerating and Air-Conditioning Engineers) may be formed by a combination of the first to seventh conditions.
(Effects)

The above-described configuration allows the creation and correction of the operation plan of the air-conditioning equipment 12 in consideration of the comfort from various perspectives including not only the temperature but also the humidity and the $CO_2$ concentration.

Embodiment 5

The temporal variation of the room temperature and the spatial variation of the room temperature have been described in Embodiment 1. Such variations are caused by allowing the room temperature to change within a certain comfortable temperature range as a restrictive condition, not operating the air-conditioning apparatus to maintain the room temperature at the constant set temperature.

Factors causing such temporal and spatial variations of the room temperature will be described in Embodiment 5. Specifically, a description will be given of one of the operations executed by the operation plan creation unit 33, that is, the creation of the operation plan based on temporal dispersion of the process heat load and spatial dispersion of the process heat load. A description of parts in common with those of Embodiments 1 to 4 will be omitted.
(Characteristics of Air-Conditioning Apparatus)

General characteristics of the air-conditioning apparatus will first be described with reference to FIG. 19. FIG. 19 is a diagram illustrating general characteristics of the air-conditioning apparatus. FIG. 19 is a graph of the air-conditioning efficiency (COP: Coefficient of Performance) relative to the output of the air-conditioning apparatus. COP represents the ratio of the output (process heat amount kW) to the input (power kW) to the air-conditioning apparatus. As illustrated in FIG. 19, the air-conditioning apparatus usually has a characteristic of being inefficient in a low output range and a high output range. In the example illustrated in FIG. 19, the air-conditioning apparatus has a characteristic of being most efficient at 60% of the rated output. The temporal dispersion of the process heat load and the spatial dispersion of the process heat load are processes using such characteristics of the air-conditioning apparatus.
(Overview of Temporal Dispersion of Process Heat Load)

An overview of the temporal dispersion of the process heat load will now be described. In the temporal dispersion of the process heat load, at least a part of the heat load in one of time slots in the air-conditioning operation plan application period is processed in another time slot. For example, as described in Embodiment 1, if a system has a temperature prediction model based on a heat conduction equation, such a system is capable of predicting the change over time of the room temperature. Accordingly, such a system is capable of creating an operation plan according to a process based on the temporal dispersion while maintaining the comfortable temperature range.

Specifically, the output in a given time slot is shifted to an output of high air-conditioning efficiency, and the output in another time slot is changed accordingly. In the example in FIG. 19, if the output for maintaining the set temperature in a given time slot is lower than 60%, for example, the output is shifted in the higher direction. In contrast, the output is shifted in the lower direction in one of the other time slots. Herein, such a shift in the lower direction includes at least one of a shift increasing the air-conditioning efficiency and a shift reducing the air-conditioning efficiency, and may be either one thereof.

Meanwhile, if the output for maintaining the set temperature in a given time slot is higher than 60%, for example, the output is shifted in the lower direction. In contrast, the output is shifted in the higher direction in one of the other times. Herein, such a shift in the higher direction includes at least one of a shift increasing the air-conditioning efficiency and a shift reducing the air-conditioning efficiency, and may be either one thereof.

If the output is balanced by thus performing the shift in the direction of increasing the output and the shift in the direction of reducing the output, and is set to realize high air-conditioning efficiency by the shift in at least one of the directions, the energy consumption is reduced while the total process heat amount is equalized.

(Overview of Spatial Dispersion of Process Heat Load)

An overview of the spatial dispersion of the process heat load will now be described. In the spatial dispersion of the process heat load, at least a part of the heat load in one of zones is processed by an air-conditioning apparatus allocated with an adjacent zone. As described in Embodiment 1, if a system has a heat load prediction model based on a heat conduction equation for each of the zones, such a system is capable of predicting the room temperature for each of the zones and the heat load for each of the zones while taking the heat transfer between the zones into consideration. Accordingly, such a system is capable of creating an operation plan according to a process based on the spatial dispersion while maintaining the comfortable temperature range.

Specifically, the output in a given zone is shifted to an output of high air-conditioning efficiency, and the output in another zone adjacent to the zone is changed accordingly. In the example in FIG. 19, if the output for maintaining the set temperature in a given zone is lower than 60%, for example, the output is shifted in the higher direction. In contrast, the output is shifted in the lower direction in one of the other zones. Herein, such a shift in the lower direction includes at least one of a shift increasing the air-conditioning efficiency and a shift reducing the air-conditioning efficiency, and may be either one thereof.

Meanwhile, if the output for maintaining the set temperature in a given zone is higher than 60%, for example, the output is shifted in the lower direction. In contrast, the output is shifted in the higher direction in one of the other zones. Herein, such a shift in the higher direction includes at least one of a shift increasing the air-conditioning efficiency and a shift reducing the air-conditioning efficiency, and may be either one thereof.

If the output is balanced by thus performing the shift in the direction of increasing the output and the shift in the direction of reducing the output, and is set to realize high air-conditioning efficiency by the shift in at least one of the directions, the energy consumption is reduced while the total process heat amount is equalized.

That is, the air-conditioning control system 1 performs different process heat amount changing operations for respective segments, such as time slots and zones. For example, if having performed an operation of increasing the air-conditioning efficiency as the process heat amount changing operation corresponding to a first segment, the air-conditioning control system 1 performs an operation of offsetting the change of the process heat amount in the first segment as the process heat amount changing operation corresponding to a second segment different from the first segment.

For example, if having selected an operation of increasing the output to increase the air-conditioning efficiency as the process heat amount changing operation corresponding to time slot N, the air-conditioning control system 1 selects an operation of reducing the output as the process heat amount changing operation corresponding to time slot M.

Further, if having selected an operation of reducing the output to increase the air-conditioning efficiency as the process heat amount changing operation corresponding to time slot N, the air-conditioning control system 1 selects an operation of increasing the output as the process heat amount changing operation corresponding to time slot M.

Further, if having selected an operation of increasing the output to increase the air-conditioning efficiency as the process heat amount changing operation corresponding to zone A, the air-conditioning control system 1 selects an operation of reducing the output as the process heat amount changing operation corresponding to a zone adjacent to zone A.

Further, if having selected an operation of reducing the output to increase the air-conditioning efficiency as the process heat amount changing operation corresponding to zone A, the air-conditioning control system 1 selects an operation of increasing the output as the process heat amount changing operation corresponding to the zone adjacent to zone A.

(Functional Configuration)

Figure 20:
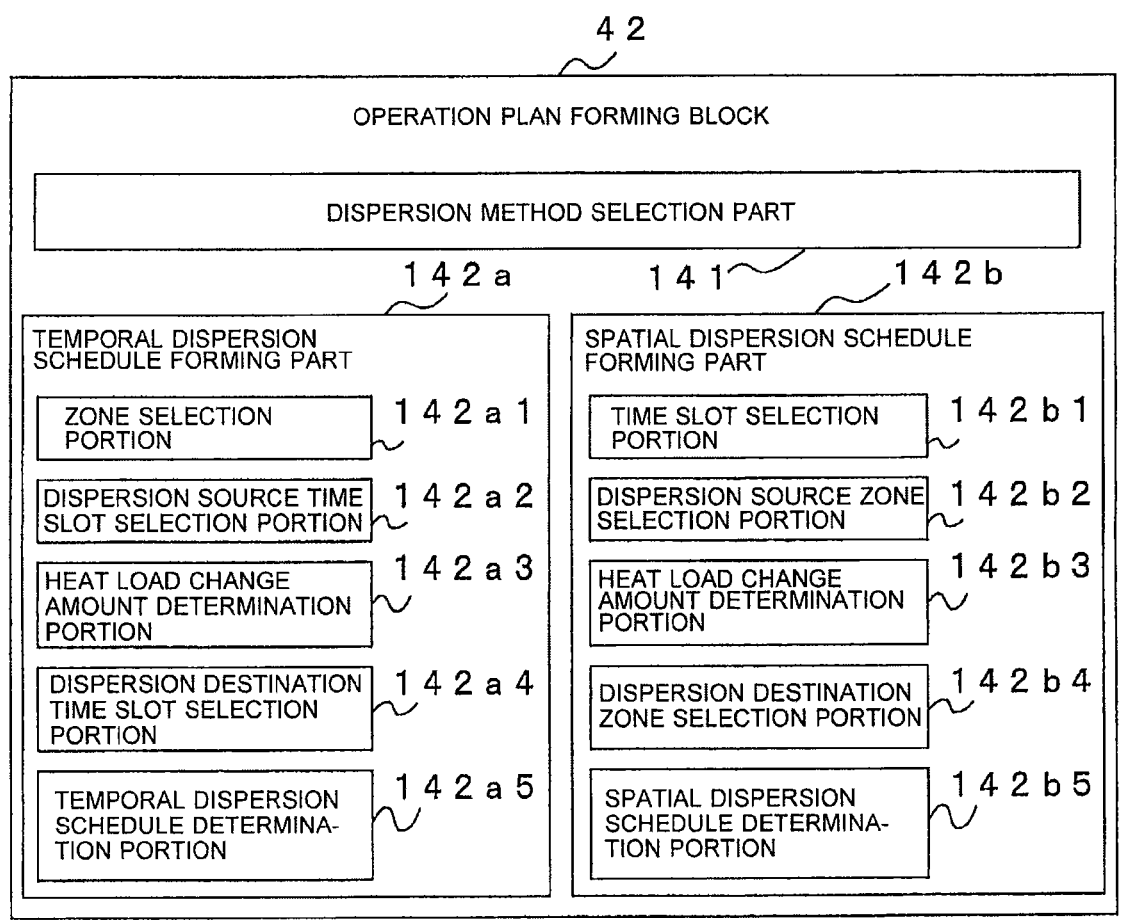
FIG. 20 is a diagram illustrating an example of the functional configuration for the operation plan in Embodiment 5 of the present invention.

A functional configuration for implementing the operation plan in Embodiment 5 will now be described with reference to FIG. 20. FIG. 20 is a diagram illustrating an example of the functional configuration for the operation plan in Embodiment 5 of the present invention. FIG. 20 is an example of the internal functional configuration of the operation plan forming block 42. In the following description, a plan of the air-conditioning operation will be described as a schedule in Embodiment 5.

(Functional Configuration: Dispersion Method Selection Part)

A dispersion method selection part 141 selects one of the formation of a schedule for processing the temporal dispersion of the process heat load and the formation of a schedule for processing the spatial dispersion of the process heat load. In the process of forming a schedule, the dispersion method selection part 141 usually forms a plurality of schedules as candidates for the ultimate schedule. In the formation of the plurality of schedules, the method of selecting between the temporal dispersion and the spatial dispersion is not particularly limited.

For example, the temporal dispersion and the spatial dispersion may be cyclically selected in turn. Further, the higher one of a power consumption reduction effect and a running cost reduction effect may be preferentially selected based on a past schedule formation history. Further, the one stochastically higher in reduction effect may be selected. That is, it suffices if one thereof is uniquely selected.

(Functional Configuration: Temporal Dispersion Schedule Forming Part)

A temporal dispersion schedule forming part 142a forms the schedule for processing the temporal dispersion of the process heat load. The temporal dispersion schedule forming part 142a includes a zone selection portion 142a1, a dispersion source time slot selection portion 142a2, a heat load change amount determination portion 142a3, a dispersion destination time slot selection portion 142a4, and a temporal dispersion schedule determination portion 142a5.

The zone selection portion 142a1 selects a zone to be subjected to the temporal dispersion of the process heat load. As a selection method, the zone selection portion 142a1 selects a zone having the lowest average air-conditioning efficiency in the entire plan application period, for example. However, the method is not particularly limited thereto. For example, the zone selection portion 142a1 may select a zone allocated with an air-conditioning apparatus having the lowest air-conditioning efficiency throughout all time slots and all zones. Further, if the zones are selected multiple times, the zone selection portion 142a1 may select the zones cyclically in turn. Further, the zone selection portion 142a1 may stochastically select a zone irrespective of the air-conditioning efficiency. That is, it suffices if one of the zones is uniquely selected.

The dispersion source time slot selection portion 142a2 selects a time slot as the dispersion source of the process heat load in the zone selected by the zone selection portion 142a1. As a selection method, the dispersion source time slot selection portion 142a2 may divide the plan application period by the 5-minute interval, for example, and select from the divided time slots a time slot in which the air-conditioning apparatus allocated with the zone operates at the lowest efficiency, for example. However, the method is not particularly limited thereto. For example, the dispersion source time slot selection portion 142a2 may select a plurality of time slots in which the operation takes place at low air-conditioning efficiency and stochastically select a time slot from the plurality of time slots. That is, it suffices if one of the time slots is uniquely selected.

The heat load change amount determination portion 142a3 determines the heat load change amount, that is, the amount of the heat load to be temporarily dispersed, in the time slot selected by the dispersion source time slot selection portion 142a2 in the zone selected by the zone selection portion 142a1. As a determination method, the heat load change amount determination portion 142a3 may determine the change amount required to obtain the output of the maximum air-conditioning efficiency as the heat load change amount, for example. However, the method is not particularly limited thereto. For example, the heat load change amount determination portion 142a3 may determine a preset change amount as the heat load change amount. Further, the heat load change amount determination portion 142a3 may determine the amount obtained by multiplying a preset change amount by a stochastic coefficient as the heat load change amount. Further, the heat load change amount determination portion 142a3 may determine the heat load change amount by estimating the change amount allowing the maintenance of the comfortable temperature range from parameters in the heat load prediction model or the temperature prediction model.

The dispersion destination time slot selection portion 142a4 selects a time slot as the dispersion destination of the process heat load in the zone selected by the zone selection portion 142a1. As a selection method, the dispersion destination time slot selection portion 142a4 may divide the plan application period by the 5-minute interval, for example, and select from the divided time slots a time slot in which the air-conditioning apparatus allocated with the zone operates at the lowest air-conditioning efficiency, for example. However, the method is not particularly limited thereto. For example, the dispersion destination time slot selection portion 142a4 may select a plurality of time slots in which the operation takes place at low air-conditioning efficiency and stochastically select a time slot from the plurality of time slots. Further, the dispersion destination time slot selection portion 142a4 may stochastically select a time slot from all time slots.

Further, if the heat load change amount determined by the heat load change amount determination portion 142a3 has a positive value, the dispersion destination time slot selection portion 142a4 may preferentially select a time slot allocated to an air-conditioning apparatus operating with an output higher than the output of the maximum air-conditioning efficiency. If the heat load change amount has a negative value, the dispersion destination time slot selection portion 142a4 may preferentially select a time slot allocated to an air-conditioning apparatus operating with an output lower than the output of the maximum air-conditioning efficiency. That is, it suffices if one of the time slots is uniquely selected.

The temporal dispersion schedule determination portion 142a5 first disperses the heat load with the respective functions described above, and thereafter recalculates the heat load in the plan application period. That is, if the heat load change amount determined by the heat load change amount determination portion 142a3 has a positive value, the temporal dispersion schedule determination portion 142a5 increases the heat load in the dispersion source time slot by the heat load change amount and reduces the heat load in the dispersion destination time slot by the heat load change amount in the zone selected by the zone selection portion 142a1.

Meanwhile, if the heat load change amount determined by the heat load change amount determination portion 142a3 has a negative value, the temporal dispersion schedule determination portion 142a5 reduces the heat load in the dispersion source time slot by the heat load change amount and increases the heat load in the dispersion destination time slot by the heat load change amount in the zone selected by the zone selection portion 142a1.

The temporal dispersion schedule determination portion 142a5 then obtains an air-conditioning operation for processing the thus-recalculated heat load, and determines a provisional schedule based on the temporal dispersion.

(Function: Spatial Dispersion Schedule Forming Part)

A spatial dispersion schedule forming part 142b forms the schedule for performing the spatial dispersion of the process heat load. The spatial dispersion schedule forming part 142b includes a time slot selection portion 142b1, a dispersion source zone selection portion 142b2, a heat load change amount determination portion 142b3, a dispersion destination zone selection portion 142b4, and a spatial dispersion schedule determination portion 142b5.

The time slot selection portion 142b1 selects a time slot to be subjected to the spatial dispersion of the process heat load. As a selection method, the time slot selection portion 142b1 may select a time slot in which the total average air-conditioning efficiency of all zones is the lowest, for example. However, the method is not particularly limited thereto. For example, the time slot selection portion 142b1 may select a time slot including an air-conditioning apparatus having the lowest air-conditioning efficiency throughout all time slots and all zones. Further, if the time slots are selected multiple times, the time slot selection portion 142b1 may select the time slots cyclically in turn. Further, the time slot selection portion 142b1 may stochastically select a time slot irrespective of the air-conditioning efficiency. That is, it suffices if one of the time slots is uniquely selected.

The dispersion source zone selection portion 142b2 selects a zone as the dispersion source of the process heat load in the time slot selected by the time slot selection portion 142b1. As a selection method, the dispersion source zone selection portion 142b2 selects a zone in which the air-conditioning apparatus operates at the lowest air-conditioning efficiency, for example. However, the method is not particularly limited thereto. For example, the dispersion source zone selection portion 142b2 may select a plurality of zones in which the operation takes place at low air-conditioning efficiency and stochastically select a zone from the plurality of zones. Further, the dispersion source zone selection portion 142$b$2 may stochastically select a zone from all zones. That is, it suffices if one of the zones is uniquely selected.

The heat load change amount determination portion 142$b$3 determines the heat load change amount, that is, the amount of the heat load to be spatially dispersed, corresponding to the zone selected by the dispersion source zone selection portion 142$b$2 in the time slot selected by the time slot selection portion 142$b$1. As a determination method, the heat load change amount determination portion 142$b$3 determines the change amount required to obtain the output of the maximum air-conditioning efficiency as the heat load change amount, for example. However, the method is not particularly limited thereto. For example, the heat load change amount determination portion 142$b$3 may determine a preset change amount as the heat load change amount. Further, the heat load change amount determination portion 142$b$3 may determine the amount obtained by multiplying a preset change amount by a stochastic coefficient as the heat load change amount. Further, the heat load change amount determination portion 142$b$3 may determine the heat load change amount by estimating the change amount allowing the maintenance of the comfortable temperature range from parameters in the heat load prediction model or the temperature prediction model.

The dispersion destination zone selection portion 142$b$4 selects a zone as the dispersion destination of the process heat load in the time slot selected by the time slot selection portion 142$b$1. As a selection method, the dispersion destination zone selection portion 142$b$4 may select a zone in which the air-conditioning apparatus operates at the lowest air-conditioning efficiency, for example. However, the method is not particularly limited thereto. For example, the dispersion destination zone selection portion 142$b$4 may select a plurality of zones in which the operation takes place at low air-conditioning efficiency and stochastically select a zone from the plurality of zones. Further, the dispersion destination zone selection portion 142$b$4 may stochastically select a zone from all zones.

Further, if the heat load change amount determined by the heat load change amount determination portion 142$b$3 has a positive value, the dispersion destination zone selection portion 142$b$4 may preferentially select a zone allocated to an air-conditioning apparatus operating with an output higher than the output of the maximum air-conditioning efficiency. If the heat load change amount has a negative value, the dispersion destination zone selection portion 142$b$4 may preferentially select a zone allocated to an air-conditioning apparatus operating with an output lower than the output of the maximum air-conditioning efficiency. That is, it suffices if one of the zones is uniquely selected.

The spatial dispersion schedule determination portion 142$b$5 first disperses the heat load with the respective functions described above, and thereafter recalculates the heat load in the plan application period. That is, if the heat load change amount determined by the heat load change amount determination portion 142$b$3 has a positive value, the spatial dispersion schedule determination portion 142$b$5 increases the heat load in the dispersion source zone by the heat load change amount and reduces the heat load in the dispersion destination zone by the heat load change amount in the time slot selected by the time slot selection portion 142$b$1.

Meanwhile, if the heat load change amount determined by the heat load change amount determination portion 142$b$3 has a negative value, the spatial dispersion schedule determination portion 142$b$5 reduces the heat load in the dispersion source zone by the heat load change amount and increases the heat load in the dispersion destination zone by the heat load change amount in the time slot selected by the time slot selection portion 142$b$1. The spatial dispersion schedule determination portion 142$b$5 then obtains an air-conditioning operation for processing the thus-recalculated heat load, and determines a provisional schedule based on the spatial dispersion.

(Operation)

Figure 21:
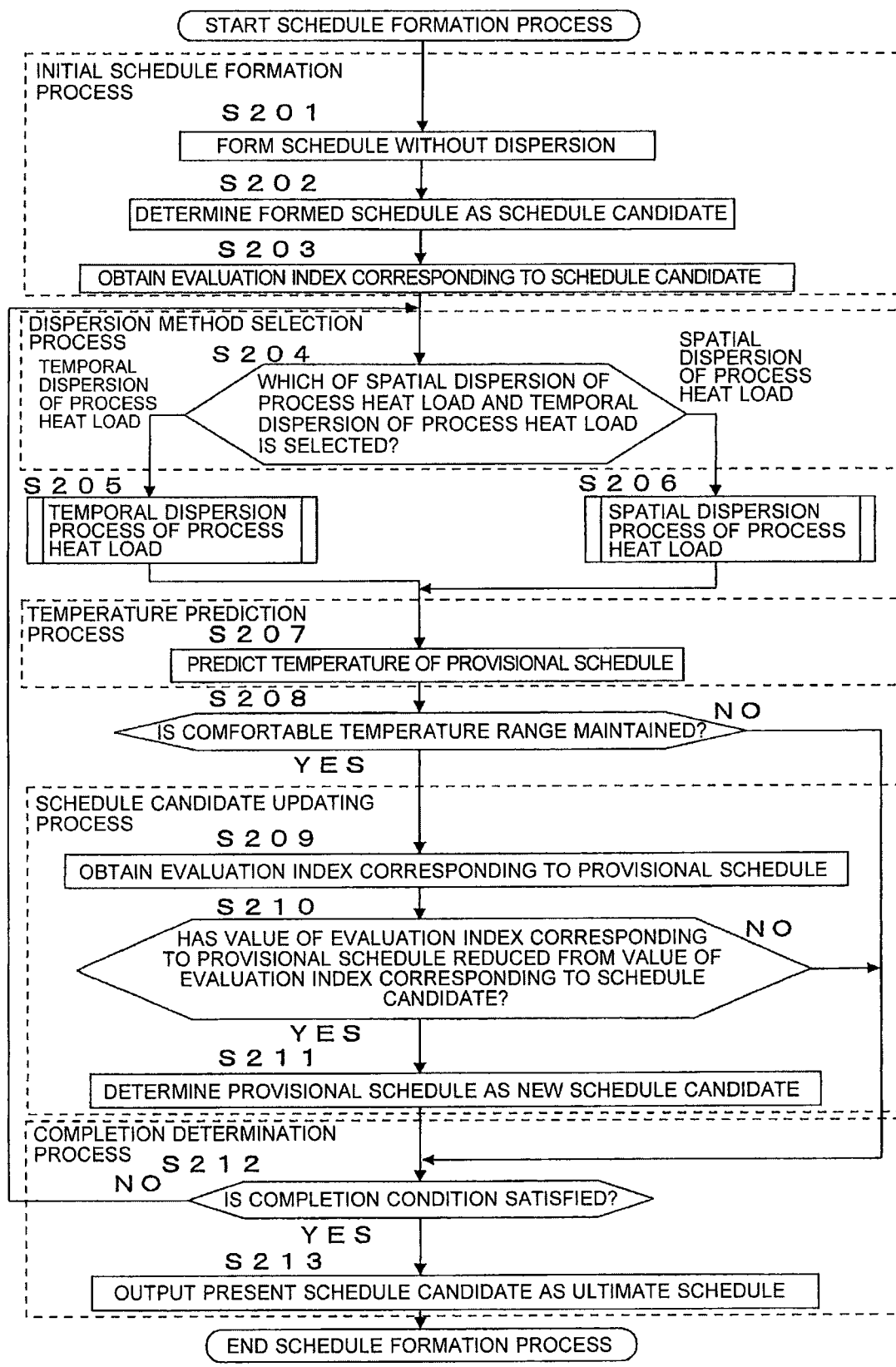
FIG. 21 is a flowchart illustrating an example of an operation of forming the operation plan in Embodiment 5 of the present invention.
Figure 22:
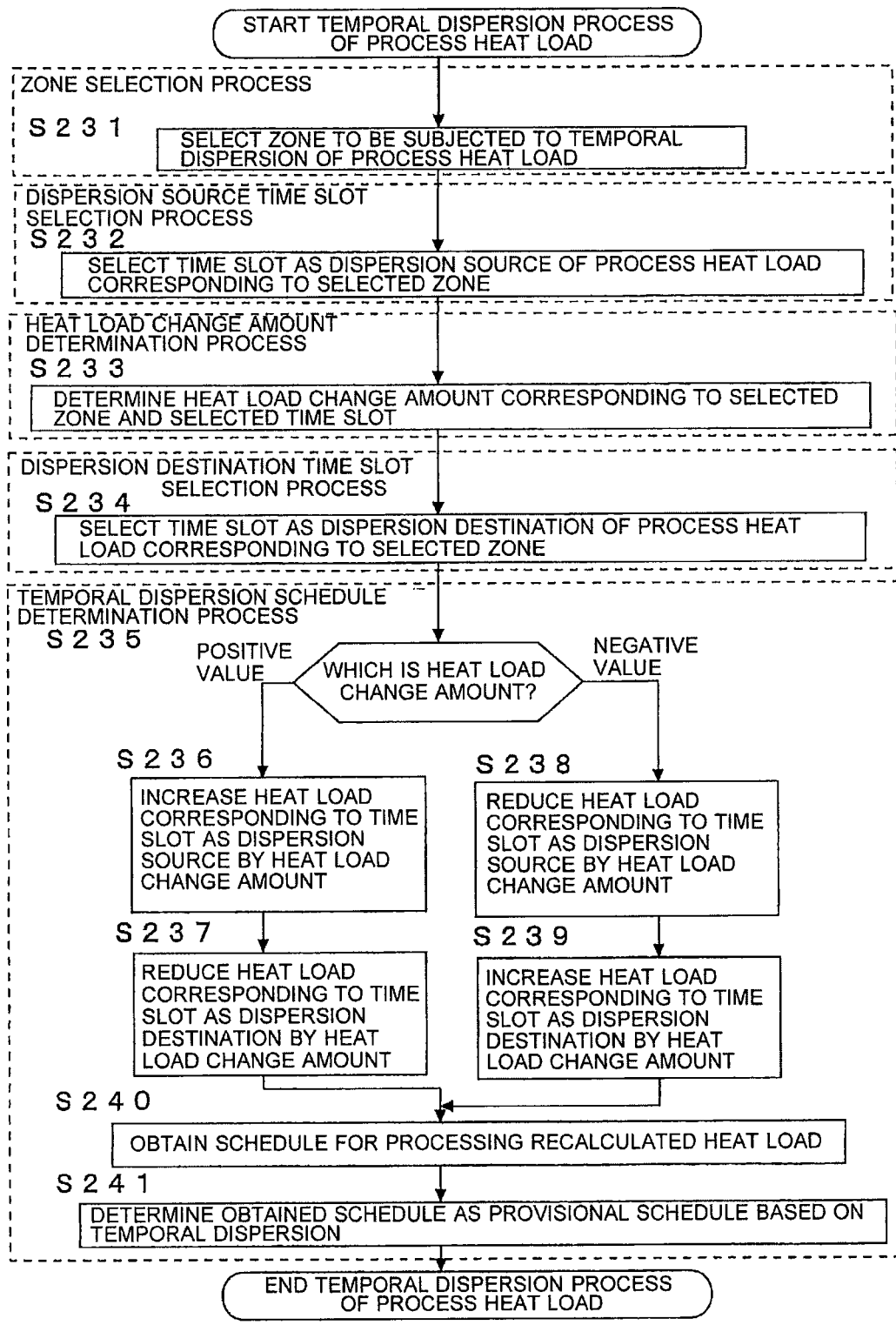
FIG. 22 is a flowchart illustrating a temporal dispersion process of a process heat load in Embodiment 5 of the present invention.
Figure 23:
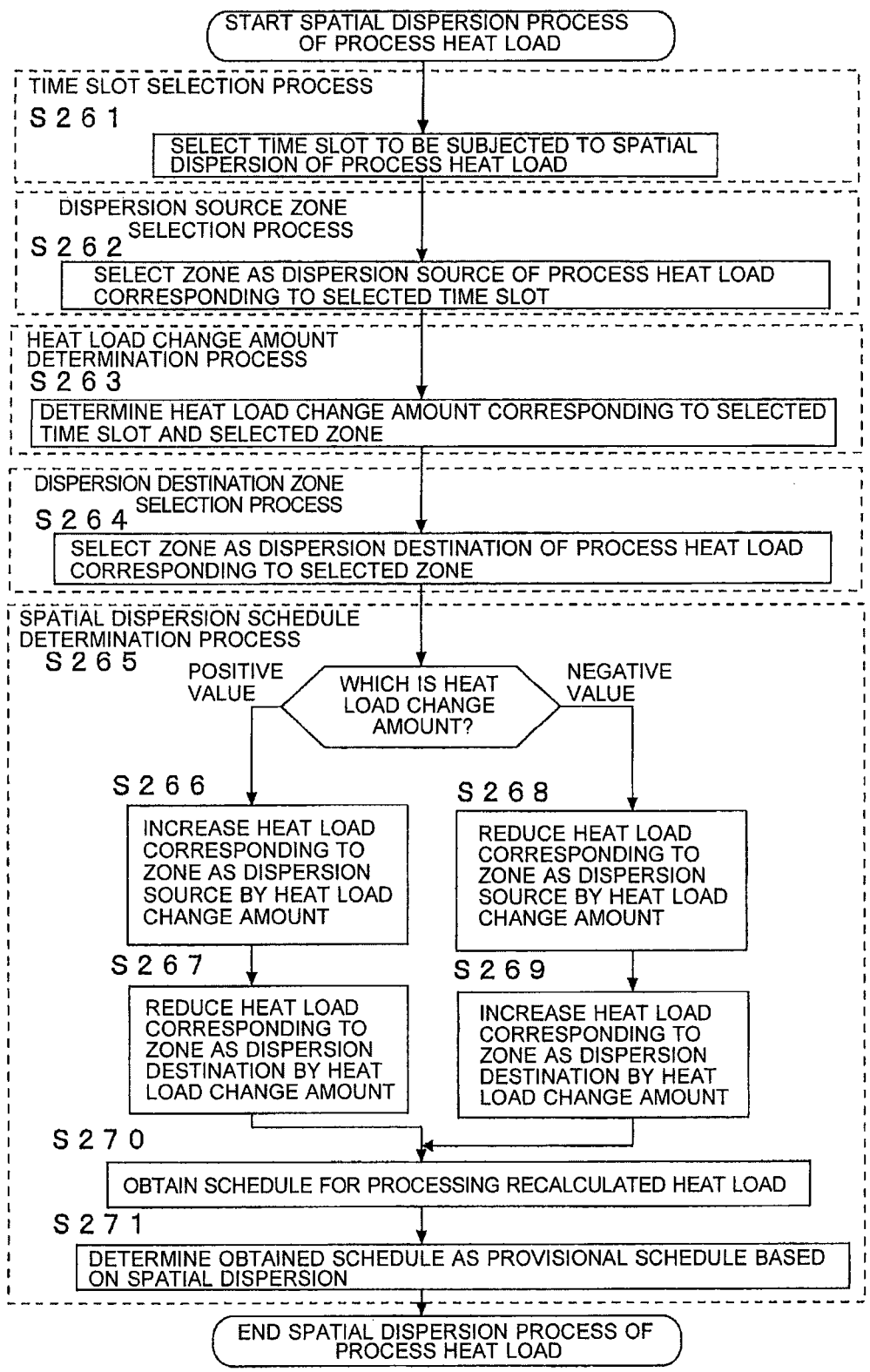
FIG. 23 is a flowchart illustrating a spatial dispersion process of a process heat load in Embodiment 5 of the present invention.

An operation example assuming the above-described functional configuration will now be described with reference to FIGS. 21 to 23. FIG. 21 is a flowchart illustrating an example of the operation of forming the operation plan in Embodiment 5 of the present invention. FIG. 22 is a flowchart illustrating the temporal dispersion process of the process heat load in Embodiment 5 of the present invention. FIG. 23 is a flowchart illustrating the spatial dispersion process of the process heat load in Embodiment 5 of the present invention.

FIG. 21 is a flowchart illustrating an example of the formation of the operation plan, that is, the schedule, in Embodiment 5 of the present invention. As illustrated in FIG. 21, the formation of the schedule includes an initial schedule formation process, a dispersion method selection process, a temporal dispersion process, a spatial dispersion process, a temperature prediction process, a schedule candidate updating process, and a completion determination process.

As illustrated in FIG. 22, the temporal dispersion process includes a zone selection process, a dispersion source time slot selection process, a heat load change amount determination process, a dispersion destination time slot selection process, and a temporal dispersion schedule determination process.

As illustrated in FIG. 23, the spatial dispersion process includes a time slot selection process, a dispersion source zone selection process, a heat load change amount determination process, a dispersion destination zone selection process, and a spatial dispersion schedule determination process.

(Initial Schedule Formation Process)
(Step S201)

The air-conditioning control system 1 forms a schedule without dispersion. That is, the air-conditioning control system 1 forms a schedule of the air-conditioning operation assuming a state in which the process heat load is not dispersed.

(Step S202)

The air-conditioning control system 1 determines the formed schedule as a schedule candidate.

(Step S203)

The air-conditioning control system 1 obtains the evaluation index corresponding to the schedule candidate.

(Dispersion Method Selection Process)
(Step S204)

The air-conditioning control system 1 selects one of the spatial dispersion of the process heat load and the temporal dispersion of the process heat load. If having selected the temporal dispersion of the process heat load, the air-conditioning control system 1 proceeds to step S205. Meanwhile, if having selected the spatial dispersion of the process heat load, the air-conditioning control system 1 proceeds to step S206.

(Temporal Dispersion Process of Process Heat Load)
(Step S205)

The air-conditioning control system 1 executes the temporal dispersion process of the process heat load, details of which will be described later. As a result of the temporal dispersion process of the process heat load, a provisional schedule is determined.
(Spatial Dispersion Process of Process Heat Load)
(Step S206)

The air-conditioning control system 1 executes the spatial dispersion process of the process heat load, details of which will be described later. As a result of the spatial dispersion process of the process heat load, a provisional schedule is determined.
(Temperature Prediction Process)
(Step S207)

The air-conditioning control system 1 predicts the temperature in the room in the plan application period on the assumption that the provisional schedule will be executed.
(Step S208)

The air-conditioning control system 1 determines whether or not the comfortable temperature range is maintained. If the comfortable temperature range is maintained, the air-conditioning control system 1 proceeds to step S209. Meanwhile, if the comfortable temperature range is not maintained, the air-conditioning control system 1 proceeds to step S212.

That is, the air-conditioning control system 1 predicts the temperature in the plan application period corresponding to the provisional schedule determined at step S205 or step S206. If the predicted room temperature fails to be maintained in the comfortable temperature range, the air-conditioning control system 1 proceeds to step S212 without executing evaluation corresponding to the provisional schedule.
(Schedule Candidate Updating Process)
(Step S209)

The air-conditioning control system 1 obtains the evaluation index corresponding to the provisional schedule.
(Step S210)

The air-conditioning control system 1 determines whether or not the value of the evaluation index corresponding to the provisional schedule has reduced from the value of the evaluation index corresponding to the schedule candidate. If the value of the evaluation index corresponding to the provisional schedule has reduced from the value of the evaluation index corresponding to the schedule candidate, the air-conditioning control system 1 proceeds to step S211. Meanwhile, if the value of the evaluation index corresponding to the provisional schedule has not reduced from the value of the evaluation index corresponding to the schedule candidate, the air-conditioning control system 1 proceeds to step S212.
(Step S211)

The air-conditioning control system 1 determines the provisional schedule as a new schedule candidate.

That is, the air-conditioning control system 1 calculates the evaluation index corresponding to the provisional schedule determined at step S205 or step S206. If the evaluation index is smaller than that of the present schedule candidate, the air-conditioning control system 1 determines the provisional schedule as a new schedule candidate.

Even if the evaluation index is larger than that of the present schedule candidate, the air-conditioning control system 1 may stochastically determine the provisional schedule as a new schedule candidate.
(Completion Determination Process)
(Step S212)

The air-conditioning control system 1 determines whether or not a completion condition is satisfied. If the completion condition is satisfied, the air-conditioning control system 1 proceeds to step S213. Meanwhile, if the completion condition is not satisfied, the air-conditioning control system 1 proceeds to step S204.
(Step S213)

The air-conditioning control system 1 outputs the present schedule candidate as the ultimate schedule.

That is, the air-conditioning control system 1 determines whether or not to complete the process of schedule formation. For example, if the evaluation index falls below a predetermined target value, the air-conditioning control system 1 completes the schedule formation. However, the completion condition is not particularly limited thereto.

For example, the air-conditioning control system 1 completes the schedule formation if the time required for the schedule formation exceeds a predetermined time. Further, the air-conditioning control system 1 completes the schedule formation if the reduction in the evaluation index of the schedule candidate falls below a predetermined reduction rate. Further, the air-conditioning control system 1 completes the schedule formation if updating of the schedule candidate does not take place at least a predetermined number of times.
(Temporal Dispersion Process of Process Heat Load)
(Zone Selection Process)
(Step S231)

The air-conditioning control system 1 selects a zone to be subjected to the temporal dispersion of the process heat load.
(Dispersion Source Time Slot Selection Process)
(Step S232)

The air-conditioning control system 1 selects a time slot as the dispersion source of the process heat load corresponding to the selected zone.
(Heat Load Change Amount Determination Process)
(Step S233)

The air-conditioning control system 1 determines the heat load change amount corresponding to the selected zone and the selected time slot. That is, the air-conditioning control system 1 determines the amount of the heat load to be temporally dispersed.
(Dispersion Destination Time Slot Selection Process)
(Step S234)

The air-conditioning control system 1 selects a time slot as the dispersion destination of the process heat load corresponding to the selected zone.
(Temporal Dispersion Schedule Determination Process)
(Step S235)

The air-conditioning control system 1 determines which is the heat load change amount. If the heat load change amount has a positive value, the air-conditioning control system 1 proceeds to step S236. Meanwhile, if the heat load change amount has a negative value, the air-conditioning control system 1 proceeds to step S238.
(Step S236)

The air-conditioning control system 1 increases the heat load corresponding to the time slot as the dispersion source by the heat load change amount.
(Step S237)

The air-conditioning control system 1 reduces the heat load corresponding to the time slot as the dispersion destination by the heat load change amount.
(Step S238)

The air-conditioning control system 1 reduces the heat load corresponding to the time slot as the dispersion source by the heat load change amount.

(Step S239)

The air-conditioning control system 1 increases the heat load corresponding to the time slot as the dispersion destination by the heat load change amount.

(Step S240)

The air-conditioning control system 1 obtains a schedule for processing the recalculated heat load.

(Step S241)

The air-conditioning control system 1 determines the obtained schedule as a provisional schedule based on the temporal dispersion, and completes the process.

That is, the air-conditioning control system 1 first recalculates the heat load in the plan application period by assuming the state after the dispersion of the process heat load. In other words, if the heat load change amount determined at step S233 has a positive value, the air-conditioning control system 1 increases the heat load in the dispersion source time slot selected at step S232 by the heat load change amount, and reduces the heat load in the dispersion destination time slot selected at step S234 by the heat load change amount.

Meanwhile, if the heat load change amount determined at step S233 has a negative value, the air-conditioning control system 1 reduces the heat load in the dispersion source time slot selected at step S232 by the heat load change amount, and increases the heat load in the dispersion destination time slot selected at step S234 by the heat load change amount. The air-conditioning control system 1 then obtains an air-conditioning operation for processing the thus-recalculated heat load, and determines the air-conditioning operation as a provisional schedule based on the temporal dispersion.

(Spatial Dispersion Process of Process Heat Load)
(Time Slot Selection Process)
(Step S261)

The air-conditioning control system 1 selects a time slot to be subjected to the spatial dispersion of the process heat load.

(Dispersion Source Zone Selection Process)
(Step S262)

The air-conditioning control system 1 selects a zone as the dispersion source of the process heat load corresponding to the selected time slot.

(Heat Load Change Amount Determination Process)
(Step S263)

The air-conditioning control system 1 determines the heat load change amount corresponding to the selected time slot and the selected zone. That is, the air-conditioning control system 1 determines the amount of the heat load to be spatially dispersed.

(Dispersion Destination Zone Selection Process)
(Step S264)

The air-conditioning control system 1 selects a zone as the dispersion destination of the process heat load corresponding to the selected zone.

(Spatial Dispersion Schedule Determination Process)
(Step S265)

The air-conditioning control system 1 determines which is the heat load change amount. If the heat load change amount has a positive value, the air-conditioning control system 1 proceeds to step S266. Meanwhile, if the heat load change amount has a negative value, the air-conditioning control system 1 proceeds to step S268.

(Step S266)

The air-conditioning control system 1 increases the heat load corresponding to the zone as the dispersion source by the heat load change amount.

(Step S267)

The air-conditioning control system 1 reduces the heat load corresponding to the zone as the dispersion destination by the heat load change amount.

(Step S268)

The air-conditioning control system 1 reduces the heat load corresponding to the zone as the dispersion source by the heat load change amount.

(Step S269)

The air-conditioning control system 1 increases the heat load corresponding to the zone as the dispersion destination by the heat load change amount.

(Step S270)

The air-conditioning control system 1 obtains a schedule for processing the recalculated heat load.

(Step S271)

The air-conditioning control system 1 determines the obtained schedule as a provisional schedule based on the spatial dispersion.

That is, the air-conditioning control system 1 first recalculates the heat load in the plan application period by assuming the state after the dispersion of the process heat load. That is, if the heat load change amount determined at step S263 has a positive value, the air-conditioning control system 1 increases the heat load in the dispersion source zone selected at step S262 by the heat load change amount, and reduces the heat load in the dispersion destination zone selected at step S264 by the heat load change amount.

Meanwhile, if the heat load change amount determined at step S263 has a negative value, the air-conditioning control system 1 reduces the heat load in the dispersion source zone selected at step S262 by the heat load change amount, and increases the heat load in the dispersion destination zone selected at step S264 by the heat load change amount. The air-conditioning control system 1 then obtains an air-conditioning operation for processing the thus-recalculated heat load, and determines the air-conditioning operation as a provisional schedule based on the spatial dispersion.

(Only One of Temporal Dispersion and Spatial Dispersion)

Although the foregoing description has been given of a method of performing at least one of the temporal dispersion of the process heat load and the spatial dispersion of the process heat load, the method is not particularly limited thereto. For example, only the temporal dispersion may be performed, or only the spatial dispersion may be performed.

(Change of Set Temperature)

In Embodiment 5, the description has been given of a method of directly determining the heat load change amount to disperse the heat load. In place of this, different target temperatures may be set for the respective time slots and the respective zones. With a change in setting of the target temperature, the air-conditioning equipment 12 performs an operation in which the process heat load is practically changed. Such setting of the target temperature may be applied to the set temperature held by the indoor unit 12b or internal information of software implemented in the air-conditioning controller 11 or the like.

(Effects)

With the process heat load thus dispersed in at least one of the temporal manner and the spatial manner in consideration of the characteristics of the air-conditioning apparatuses, the change over time of the room temperature, the heat transfer between the zones, and so forth, it is possible to perform an air-conditioning operation at overall high air-conditioning efficiency while maintaining the room temperature within the comfortable temperature range, and thus to reduce the power consumption amount.

REFERENCE SIGNS LIST 1 air-conditioning control system 11 air-conditioning controller 12 air-conditioning equipment 12a outdoor unit 12b indoor unit 12c ventilation equipment 12d total heat exchanger 12e humidifier 12f dehumidifier 12g heater 12h outside air-conditioning unit 13 air-conditioning network 14 apparatus connection controller 15 air-conditioning control computer 16 general-purpose network 19 sensor 31 condition setting unit 32 heat load prediction unit 33 operation plan creation unit 34 operation plan correction unit 35 data measurement unit 36 control command unit 41 heat load prediction block 42 operation plan forming block 43 temperature prediction block 44 plan evaluation block 46 temperature error evaluation block 47 temperature prediction block 48 corrected plan forming block 49 corrected plan evaluation block 61 floor divided into zones 62 adjacent zones 63 room temperature fluctuation curves by zone 71, 72, 81, 82 restrictive condition 91, 101 humidity prediction block 92, 102 $CO_2$ concentration prediction block 141 dispersion method selection part 142a temporal dispersion schedule forming part 142a1 zone selection portion 142a2 dispersion source time slot selection portion 142a3 heat load change amount determination portion 142a4 dispersion destination time slot selection portion 142a5 temporal dispersion schedule determination portion 142b spatial dispersion schedule forming part 142b1 time slot selection portion 142b2 dispersion source zone selection portion 142b3 heat load change amount determination portion 142b4 dispersion destination zone selection portion 142b5 spatial dispersion schedule determination portion

The invention claimed is:

1. An air-conditioning control system configured to control air-conditioning equipment installed in a building, the air-conditioning control system comprising:
a heat load prediction unit configured to predict a change over time of a heat amount to be processed by the air-conditioning equipment based on provided heat load prediction data;
an operation plan creation unit configured to previously create an operation plan of the air-conditioning equipment in an air-conditioning operation plan application period to reduce one of a power consumption amount and a running cost of the air-conditioning equipment serving as an evaluation index under a first restrictive condition that a total process heat load be maintained at one of a same level and within a range of a predetermined amount of difference and that a temperature in a room be maintained within a predetermined comfortable temperature range;
an operation plan correction unit configured to correct the operation plan in a predetermined cycle during execution of control of the air-conditioning equipment in accordance with the operation plan; and
a temperature sensor configured to measure the temperature in the room,
wherein the operation plan creation unit and the operation plan correction unit include a temperature prediction block configured to predict a change over time of the temperature in the room based on provided temperature prediction data,
wherein when an actually measured temperature measured by the temperature sensor is different from a predicted temperature predicted by the operation plan creation unit at a time of creation of the operation plan, the operation plan correction unit predicts a change over time of the temperature in the room in a correction application period in the plan application period, in which correction is performed, and corrects the operation plan to minimize the evaluation index under the first restrictive condition, with a second restrictive condition set as that an error between a predicted temperature predicted by the operation plan correction unit and the predicted temperature predicted by the operation plan creation unit be maintained within a predetermined allowable fluctuation range at one time or a plurality of times in the correction application period.

2. The air-conditioning control system of claim 1, wherein the first restrictive condition is combined with a restriction that a time rate of change of the temperature in the room in the plan application period be maintained within a preset temperature change rate.

3. The air-conditioning control system of claim 1, wherein when an operation pattern of the air-conditioning equipment does not satisfy the first restrictive condition, the operation plan creation unit redefines the evaluation index as a sum of the evaluation index and a weighted deviation amount from the first restrictive condition, and creates the operation plan based on the redefined evaluation index.

4. The air-conditioning control system of claim 1, wherein when an operation pattern of the air-conditioning equipment does not satisfy the first restrictive condition and the second restrictive condition, the operation plan correction unit redefines the evaluation index as a sum of the evaluation index and weighted deviation amounts from the first restrictive condition and the second restrictive condition, and corrects the operation plan based on the redefined evaluation index.

5. The air-conditioning control system of claim 1, wherein the operation plan creation unit combines the first restrictive condition with a restriction that power consumption corresponding to a first period included in the plan application period be maintained up to first target power, that power consumption in a period in the plan application period excluding the first period be maintained up to second target power, and that a comfortable temperature range corresponding to a second period preceding the first period be set to a range different from a comfortable temperature range corresponding to the first period.

6. The air-conditioning control system of claim 1, wherein the operation plan creation unit combines the first restrictive condition with a restriction that power consumption corresponding to a first period included in the plan application period be maintained up to first target power, that power consumption in a period in the plan application period excluding the first period be maintained up to second target power, and that a set temperature corresponding to a second period included in the plan application period and preceding the first period be set in a range different from a range of a set temperature corresponding to the first period.

7. The air-conditioning control system of claim 5, wherein the operation plan creation unit repeats setting of reducing in steps a comfortable temperature range corresponding to one of the second period and a set temperature corresponding to the second period and setting of extending the second period in steps until a comfortable temperature corresponding to the first period satisfies the first restrictive condition.

8. The air-conditioning control system of claim 1, further comprising at least one or more of:
a first pair including a humidity sensor configured to measure humidity in the room as an air-conditioned space of the air-conditioning equipment and a humidity prediction unit configured to predict a change over time of the humidity in the room based on provided humidity prediction data; and a second pair including a $CO_2$ sensor configured to measure a $CO_2$ concentration in the room as the air-conditioned space of the air-conditioning equipment and a $CO_2$ concentration prediction unit configured to predict a change over time of the $CO_2$ concentration in the room based on provided $CO_2$ concentration prediction data.

9. The air-conditioning control system of claim 8, wherein the evaluation index is combined with one or more of a degree of deviation of the temperature from a set temperature of the air-conditioning equipment, a time rate of change of the temperature in the room, a degree of deviation of the humidity from set humidity in the room, a time rate of change of the humidity in the room, a degree of deviation of the $CO_2$ concentration from a set $CO_2$ concentration in the room, and a time rate of change of the $CO_2$ concentration in the room in the plan application period.

10. The air-conditioning control system of claim 9, wherein the first restrictive condition is combined with one or more of a first condition that the time rate of change of the temperature in the room in the plan application period be maintained within a preset temperature change rate, a second condition that the humidity in the room in the plan application period be maintained within a preset comfortable humidity range, a third condition that the time rate of change of the humidity in the room in the plan application period be maintained within a preset humidity change rate, a fourth condition that temperature-humidity comfort, which is determined based on both the temperature in the room and the humidity in the room, in the plan application period be maintained within a preset comfortable temperature-humidity range, a fifth condition that the $CO_2$ concentration in the room in the plan application period be maintained within a preset comfortable $CO_2$ concentration range, and a sixth condition that the time rate of change of the $CO_2$ concentration in the room in the plan application period be maintained within a preset $CO_2$ concentration change rate.

11. An air-conditioning control method of controlling air-conditioning equipment installed in a building, the air-conditioning control method comprising:

a heat load prediction step of predicting a change over time of a heat amount to be processed by the air-conditioning equipment based on provided heat load prediction data;

an operation plan creation step of previously creating an operation plan of the air-conditioning equipment in an air-conditioning operation plan application period to reduce one of a power consumption amount and a running cost of the air-conditioning equipment serving as an evaluation index under a first restrictive condition that a total process heat load be maintained at one of a same level and within a range of a predetermined amount of difference and that a temperature in a room be maintained within a predetermined comfortable temperature range;

an operation plan correction step of correcting the operation plan in a predetermined cycle during execution of control of the air-conditioning equipment in accordance with the operation plan; and a measurement step of measuring the temperature in the room, wherein, in the operation plan creation step and the operation plan correction step, a change over time of the temperature in the room based on provided temperature prediction data is predicted, and the operation plan is corrected to minimize the evaluation index under the first restrictive condition, with a second restrictive condition set as that an error between a predicted temperature predicted by the operation plan correction step and a predicted temperature predicted by the operation plan creation step be maintained within a predetermined allowable fluctuation range.

12. The air-conditioning control method of claim 11, wherein, in the operation plan creation step, power consumption corresponding to a first period included in the plan application period is maintained up to first target power, and a comfortable temperature range corresponding to a second period preceding the first period is set to a range different from a comfortable temperature range corresponding to the first period.

13. The air-conditioning control method of claim 12, wherein, in the operation plan creation step, setting of maintaining the power consumption corresponding to the first period up to the first target power and maintaining power consumption in a period in the plan application period excluding the first period up to second target power is included as the first restrictive condition.

* * * * *